(12) United States Patent
Kale

(10) Patent No.: US 12,288,563 B2
(45) Date of Patent: *Apr. 29, 2025

(54) INTELLIGENT MICROPHONE HAVING DEEP LEARNING ACCELERATOR AND RANDOM ACCESS MEMORY

(71) Applicant: Micron Technology, Inc., Boise, ID (US)

(72) Inventor: Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 147 days.

This patent is subject to a terminal disclaimer.

(21) Appl. No.: 17/460,122

(22) Filed: Aug. 27, 2021

(65) Prior Publication Data

US 2021/0398542 A1  Dec. 23, 2021

Related U.S. Application Data

(63) Continuation of application No. 16/906,230, filed on Jun. 19, 2020, now Pat. No. 11,120,805.

(51) Int. Cl.
*G10L 17/18* (2013.01)
*G06F 17/16* (2006.01)
(Continued)

(52) U.S. Cl.
CPC .............. *G10L 17/18* (2013.01); *G06F 17/16* (2013.01); *G06N 3/08* (2013.01); *G06N 3/10* (2013.01);
(Continued)

(58) Field of Classification Search
CPC ......... G10L 17/18; G10L 17/00; G10L 17/04; G10L 17/16; G10L 25/30; G10L 25/63;
(Continued)

(56) References Cited

U.S. PATENT DOCUMENTS 9,263,036 B1    2/2016 Graves
9,661,411 B1 *  5/2017 Han ..................... H04R 31/006
(Continued)

OTHER PUBLICATIONS

International Search Report and Written Opinion, PCT/US2021/037450, mailed on Oct. 6, 2021.
(Continued)

*Primary Examiner* — Sonia L Gay
(74) *Attorney, Agent, or Firm* — Greenberg Traurig

(57) ABSTRACT

Systems, devices, and methods related to a Deep Learning Accelerator and memory are described. For example, a microphone may be configured to execute instructions with matrix operands and configured with: a transducer to convert sound waves to electrical signals; an analog to digital converter to generate audio data according to the electrical signals; random access memory to store instructions executable by the Deep Learning Accelerator and store matrices of an Artificial Neural Network; and a controller to store the audio data in the random access memory as an input to the Artificial Neural Network. The Deep Learning Accelerator can execute the instructions to generate an output of the Artificial Neural Network, which may be provided as the primary output of the microphone to a computer system, such as a voice-based digital assistant.

20 Claims, 9 Drawing Sheets

(51) Int. Cl.

| | |
|---|---|
| *G06N 3/08* | (2023.01) |
| *G06N 3/10* | (2006.01) |
| *G10L 17/00* | (2013.01) |
| *G10L 17/04* | (2013.01) |
| *G10L 25/30* | (2013.01) |
| *G10L 25/63* | (2013.01) |
| *H04R 1/04* | (2006.01) |
| *H04R 3/00* | (2006.01) |
| *H04R 17/02* | (2006.01) |

(52) U.S. Cl.
CPC .............. *G10L 17/00* (2013.01); *G10L 17/04* (2013.01); *G10L 25/30* (2013.01); *G10L 25/63* (2013.01); *H04R 1/04* (2013.01); *H04R 3/00* (2013.01); *H04R 17/02* (2013.01); *H04R 2420/07* (2013.01)

(58) Field of Classification Search
CPC ... G06N 3/08; G06N 3/10; H04R 1/04; H04R 3/00; H04R 17/02; H04R 2420/07
See application file for complete search history.

(56) References Cited

U.S. PATENT DOCUMENTS

| | | | |
|---|---|---|---|
| 9,747,546 B2 | 8/2017 | Ross et al. | |
| 10,009,666 B1* | 6/2018 | van Scheltinga | ....... G10L 15/22 |
| 10,269,343 B2 | 4/2019 | Wingate | |
| 10,417,554 B2 | 9/2019 | Scheffler | |
| 10,552,251 B2 | 2/2020 | Qin et al. | |
| 10,650,807 B2 | 5/2020 | Bocklet et al. | |
| 11,120,805 B1 | 9/2021 | Kale | |
| 11,586,889 B1* | 2/2023 | Gopalakrishnan | ... G06V 10/811 |
| 11,741,953 B2* | 8/2023 | Beaufays | ................ G10L 15/22 |
| | | | 704/201 |
| 2013/0030802 A1* | 1/2013 | Jia | ........................... G10L 15/06 |
| | | | 704/E15.001 |
| 2014/0343949 A1* | 11/2014 | Huang | ..................... H04R 3/00 |
| | | | 704/275 |
| 2015/0339570 A1 | 11/2015 | Scheffler | |
| 2017/0243577 A1* | 8/2017 | Wingate | .................. G10L 15/22 |
| 2018/0061396 A1* | 3/2018 | Srinivasan | ............ G10L 15/005 |
| 2019/0043488 A1 | 2/2019 | Bocklet et al. | |
| 2019/0051288 A1 | 2/2019 | Lee et al. | |
| 2019/0073259 A1 | 3/2019 | Qin et al. | |
| 2019/0251440 A1 | 8/2019 | Kasiviswanathan et al. | |
| 2019/0362219 A1 | 11/2019 | Scheffler | |
| 2020/0211563 A1* | 7/2020 | Arunachalam | ......... G10L 15/30 |
| 2020/0293105 A1 | 9/2020 | Ambardekar et al. | |
| 2020/0365138 A1* | 11/2020 | Kim | ....................... G10L 15/22 |
| 2021/0118464 A1* | 4/2021 | Dossman | ............... G06N 20/00 |
| 2021/0124560 A1* | 4/2021 | Liu | ....................... G06F 7/5277 |
| 2021/0134274 A1 | 5/2021 | Lee | |

OTHER PUBLICATIONS

Seyed Reza Shahamiri, et al., "Real-time frequency-based noise-robust Automatic Speech Recognition using Multi-Nets Artificial Neural Networks: A multi-views multi-learners approach." Elsevier, Neurocomputing, vol. 129, Apr. 10, 2014.

Xilinx, "FPGA Acceleration of Matrix Multiplication for Neural Networks." Application Note: Virtex UltraScale+ FPGAs, XAPP1332 (v1.0), Feb. 27, 2020.

* cited by examiner

INTELLIGENT MICROPHONE HAVING
DEEP LEARNING ACCELERATOR AND
RANDOM ACCESS MEMORY

RELATED APPLICATIONS

The present application is a continuation application of U.S. patent application Ser. No. 16/906,230 filed Jun. 19, 2020 and issued as U.S. Pat. No. 11,120,805 on Sep. 14, 2021, the entire disclosures of which application are hereby incorporated herein by reference.

TECHNICAL FIELD

At least some embodiments disclosed herein relate to microphones in general and more particularly, but not limited to, intelligent microphone powered by integrated accelerators for Artificial Neural Networks (ANNs), such as ANNs configured through machine learning and/or deep learning.

BACKGROUND

An Artificial Neural Network (ANN) uses a network of neurons to process inputs to the network and to generate outputs from the network.

For example, each neuron in the network receives a set of inputs. Some of the inputs to a neuron may be the outputs of certain neurons in the network; and some of the inputs to a neuron may be the inputs provided to the neural network. The input/output relations among the neurons in the network represent the neuron connectivity in the network.

For example, each neuron can have a bias, an activation function, and a set of synaptic weights for its inputs respectively. The activation function may be in the form of a step function, a linear function, a log-sigmoid function, etc. Different neurons in the network may have different activation functions.

For example, each neuron can generate a weighted sum of its inputs and its bias and then produce an output that is the function of the weighted sum, computed using the activation function of the neuron.

The relations between the input(s) and the output(s) of an ANN in general are defined by an ANN model that includes the data representing the connectivity of the neurons in the network, as well as the bias, activation function, and synaptic weights of each neuron. Based on a given ANN model, a computing device can be configured to compute the output(s) of the network from a given set of inputs to the network.

For example, the inputs to an ANN network may be generated based on camera inputs; and the outputs from the ANN network may be the identification of an item, such as an event or an object.

In general, an ANN may be trained using a supervised method where the parameters in the ANN are adjusted to minimize or reduce the error between known outputs associated with or resulted from respective inputs and computed outputs generated via applying the inputs to the ANN. Examples of supervised learning/training methods include reinforcement learning and learning with error correction.

Alternatively, or in combination, an ANN may be trained using an unsupervised method where the exact outputs resulted from a given set of inputs is not known before the completion of the training. The ANN can be trained to classify an item into a plurality of categories, or data points into clusters.

Multiple training algorithms can be employed for a sophisticated machine learning/training paradigm.

Deep learning uses multiple layers of machine learning to progressively extract features from input data. For example, lower layers can be configured to identify edges in an image; and higher layers can be configured to identify, based on the edges detected using the lower layers, items captured in the image, such as faces, objects, events, etc. Deep learning can be implemented via Artificial Neural Networks (ANNs), such as deep neural networks, deep belief networks, recurrent neural networks, and/or convolutional neural networks.

Deep learning has been applied to many application fields, such as computer vision, speech/audio recognition, natural language processing, machine translation, bioinformatics, drug design, medical image processing, games, etc.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
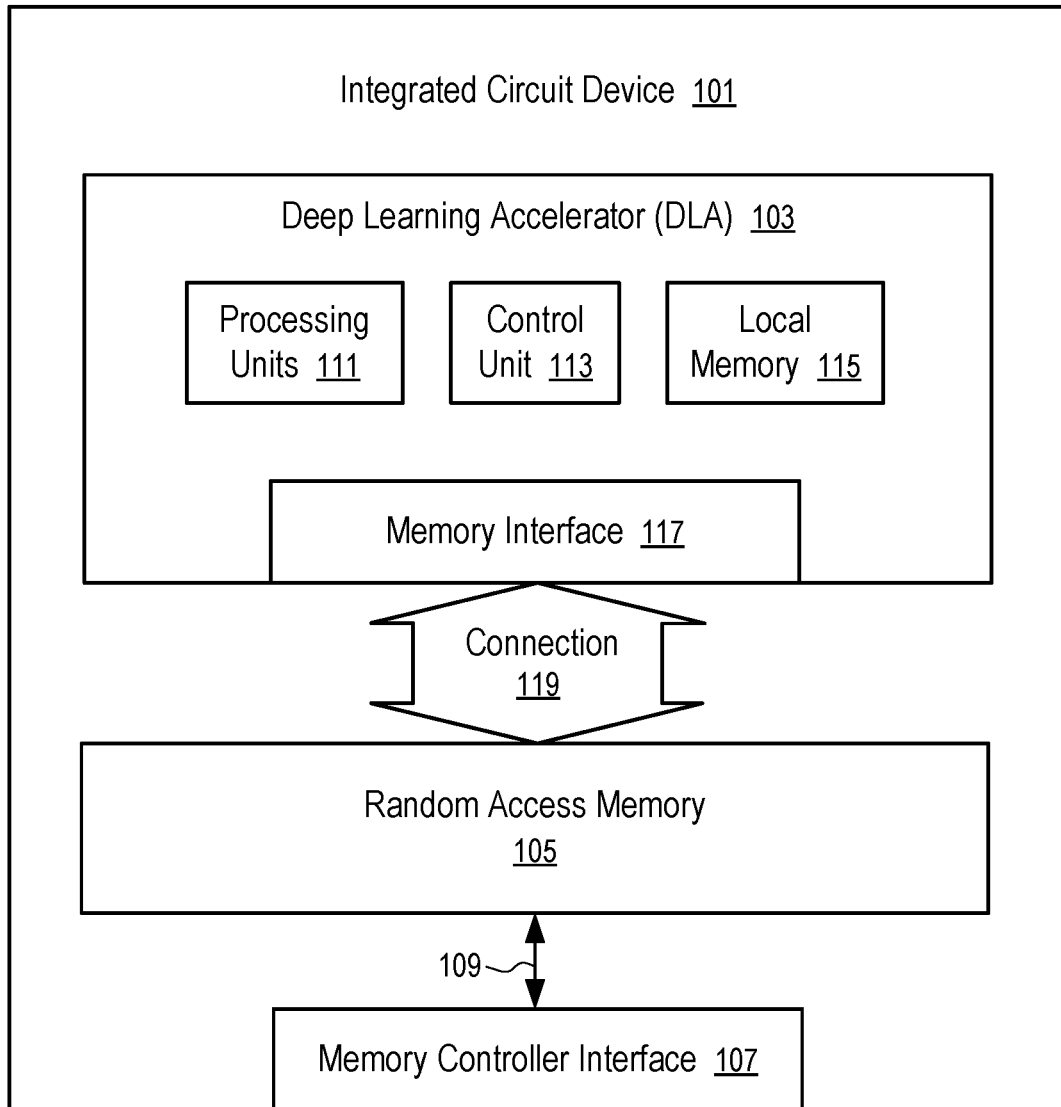
FIG. 1 shows an integrated circuit device having a Deep Learning Accelerator and random access memory configured according to one embodiment.

At least some embodiments disclosed herein provide a microphone that has a general-purpose integrated circuit configured to perform computations of Artificial Neural Networks (ANNs) with reduced energy consumption and computation time. The integrated circuit includes a Deep Learning Accelerator (DLA) and random access memory. Audio data generated in the microphone is substantially consumed by the Artificial Neural Network implemented in the microphone to generate intelligent outputs that are less voluminous than the audio data. Thus, the requirements for the capacity to store the audio data generated by the microphone and/or the requirements for the communication bandwidth between the microphone and a computing system that uses the microphone can be reduced. For example, the Artificial Neural Network (ANN) can be trained to output recognized speech in text, or identifications of other types of recognized patterns, features, or classifications that are of interest in a particular application. The outputs can be used to generate commands, instructions, transcripts, alerts, etc., and/or stored in the random access memory of the microphone for a period of time. Since the microphone outputs content of a predefined type, recognized by the Artificial Neural Network (ANN), and removes other content that is not of the predefined type, privacy protection is enhanced for the persons in an environment where the microphone is used.

The Deep Learning Accelerator (DLA) includes a set of general-purpose, programmable hardware computing logic that is specialized and/or optimized to perform parallel vector and/or matrix calculations, including but not limited to multiplication and accumulation of vectors and/or matrices.

Further, the Deep Learning Accelerator (DLA) can include one or more Arithmetic-Logic Units (ALUs) to perform arithmetic and bitwise operations on integer binary numbers.

The Deep Learning Accelerator (DLA) is programmable via a set of instructions to perform the computations of an Artificial Neural Network (ANN).

The granularity of the Deep Learning Accelerator (DLA) operating on vectors and matrices corresponds to the largest unit of vectors/matrices that can be operated upon during the execution of one instruction by the Deep Learning Accelerator (DLA). During the execution of the instruction for a predefined operation on vector/matrix operands, elements of vector/matrix operands can be operated upon by the Deep Learning Accelerator (DLA) in parallel to reduce execution time and/or energy consumption associated with memory/data access. The operations on vector/matrix operands of the granularity of the Deep Learning Accelerator (DLA) can be used as building blocks to implement computations on vectors/matrices of larger sizes.

The implementation of a typical/practical Artificial Neural Network (ANN) involves vector/matrix operands having sizes that are larger than the operation granularity of the Deep Learning Accelerator (DLA). To implement such an Artificial Neural Network (ANN) using the Deep Learning Accelerator (DLA), computations involving the vector/matrix operands of large sizes can be broken down to the computations of vector/matrix operands of the granularity of the Deep Learning Accelerator (DLA). The Deep Learning Accelerator (DLA) can be programmed via instructions to carry out the computations involving large vector/matrix operands. For example, atomic computation capabilities of the Deep Learning Accelerator (DLA) in manipulating vectors and matrices of the granularity of the Deep Learning Accelerator (DLA) in response to instructions can be programmed to implement computations in an Artificial Neural Network (ANN).

In some implementations, the Deep Learning Accelerator (DLA) lacks some of the logic operation capabilities of a typical Central Processing Unit (CPU). However, the Deep Learning Accelerator (DLA) can be configured with sufficient logic units to process the input data provided to an Artificial Neural Network (ANN) and generate the output of the Artificial Neural Network (ANN) according to a set of instructions generated for the Deep Learning Accelerator (DLA). Thus, the Deep Learning Accelerator (DLA) can perform the computation of an Artificial Neural Network (ANN) with little or no help from a Central Processing Unit (CPU) or another processor. Optionally, a conventional general purpose processor can also be configured as part of the Deep Learning Accelerator (DLA) to perform operations that cannot be implemented efficiently using the vector/matrix processing units of the Deep Learning Accelerator (DLA), and/or that cannot be performed by the vector/matrix processing units of the Deep Learning Accelerator (DLA).

A typical Artificial Neural Network (ANN) can be described/specified in a standard format (e.g., Open Neural Network Exchange (ONNX)). A compiler can be used to convert the description of the Artificial Neural Network (ANN) into a set of instructions for the Deep Learning Accelerator (DLA) to perform calculations of the Artificial Neural Network (ANN). The compiler can optimize the set of instructions to improve the performance of the Deep Learning Accelerator (DLA) in implementing the Artificial Neural Network (ANN).

The Deep Learning Accelerator (DLA) can have local memory, such as registers, buffers and/or caches, configured to store vector/matrix operands and the results of vector/matrix operations. Intermediate results in the registers can be pipelined/shifted in the Deep Learning Accelerator (DLA) as operands for subsequent vector/matrix operations to reduce time and energy consumption in accessing memory/data and thus speed up typical patterns of vector/matrix operations in implementing a typical Artificial Neural Network (ANN). The capacity of registers, buffers and/or caches in the Deep Learning Accelerator (DLA) is typically insufficient to hold the entire data set for implementing the computation of a typical Artificial Neural Network (ANN). Thus, a random access memory coupled to the Deep Learning Accelerator (DLA) is configured to provide an improved data storage capability for implementing a typical Artificial Neural Network (ANN). For example, the Deep Learning Accelerator (DLA) loads data and instructions from the random access memory and stores results back into the random access memory.

The communication bandwidth between the Deep Learning Accelerator (DLA) and the random access memory is configured to optimize or maximize the utilization of the computation power of the Deep Learning Accelerator (DLA). For example, high communication bandwidth can be provided between the Deep Learning Accelerator (DLA) and the random access memory such that vector/matrix operands can be loaded from the random access memory into the Deep Learning Accelerator (DLA) and results stored back into the random access memory in a time period that is approximately equal to the time for the Deep Learning Accelerator (DLA) to perform the computations on the vector/matrix operands. The granularity of the Deep Learning Accelerator (DLA) can be configured to increase the ratio between the amount of computations performed by the Deep Learning Accelerator (DLA) and the size of the vector/matrix operands such that the data access traffic between the Deep Learning Accelerator (DLA) and the random access memory can be reduced, which can reduce the requirement on the communication bandwidth between the Deep Learning Accelerator (DLA) and the random access memory. Thus, the bottleneck in data/memory access can be reduced or eliminated.

The Deep Learning Accelerator (DLA) and the random access memory can be configured in a microphone to convert audio data into intelligent outputs to reduce the size of data transmitted from the microphone, and/or to filter out audio content are of no interest in a predefined application.

For example, an Artificial Neural Network (ANN) can be trained to recognize the voices and speech of family and friends. When the Artificial Neural Network (ANN) is implemented in a microphone, the microphone can recognize the words spoken specifically by the family and friends but ignore the speech of other persons near the microphone. The recognized speech of the family and friends can be used to control a voice-based digital assistant, such as a smart speaker, a smart television, a smart appliance, a smart IoT (Internet of Thing) device. Since the microphone intelligently limits its transmission of voice input to the voice-based digital assistant based on the voice models of authorized users (e.g., the family and friends), the security of the voice-based digital assistant is improved.

Further, the Artificial Neural Network (ANN) can be trained to recognize speeches relevant to the control of the voice-based digital assistant and thus ignore other speech content that is not relevant to the operation of the voice-based digital assistant. Since the microphone intelligently filters out the speech content that is irrelevant to the operation of the voice-based digital assistant, privacy protection is enhanced. For example, background conversations would not be transmitted to the voice-based digital assistant and/or to a cloud computing platform; and the inadvertent eavesdropping on background conversations can be reduced and/or eliminated.

Further, the training of the Artificial Neural Network (ANN) to recognize the voices of the family and friends can be performed within the microphone. Thus, the voice models of the family and friends can be secured in the microphone for the protection of the family and friends.

Alternatively, the voice model(s) of family and friends can be stored and/or trained in a centralized platform (e.g., in a server or cloud computing platform). When authorized, the trained voice model(s) can be downloaded to the relevant microphones in the devices of the family and friends to enable customization of the microphones. Such an approach can eliminate the need to individual train multiple microphones used by the devices/computers of the family and friends.

Since the microphones can process the voice input to generate text input for voice-based digital assistants, independent from a cloud computing platform and/or a server computer, user data can be better protected for privacy. The voice input can be processed without transmitting voice data or audio data to the cloud computing platform and/or the server computer.

A microphone uses a transducer to convert sound waves into electrical signals, which can be digitized using an Analog to Digital Converter (ADC) as audio data. The microphone can generate a large amount of audio data over a period of time of continuous operation. Storing and/or uploading the audio data generated by the microphone to a server, a cloud platform, or a Central Processing Unit (CPU) for processing require a large data storage capacity and/or a high communication bandwidth.

When a microphone is configured to have the Deep Learning Accelerator (DLA) and the random access memory with an Artificial Neural Network (ANN), the audio data generated by the microphone can be locally processed to generate intelligent output to avoid or reduce the transmission of the audio data.

For example, to reduce the data storage requirement and/or data communication traffic, the Artificial Neural Network (ANN) implemented in the microphone can convert the audio data into inference results that are of interest to a specific application and thus eliminate the need to store and/or communicate most of, or all of, the audio data captured by the transducer of the microphone.

For example, the Artificial Neural Network (ANN) can be trained to recognize words spoken by a specific person. The Artificial Neural Network (ANN) not only recognizes the words spoken in a specific language, but also classifies whether the words are spoken by the specific person. A text representation of the recognized words can be provided as an output of the microphone when the words are classified as being spoken by the specific person. Thus, the same words spoken by other persons would not generate outputs from the microphone.

By providing the text representation of the recognized words spoken by the specific person as the output of the microphone, the microphone eliminates inadvertent eavesdropping on the words spoken by other persons near the microphone and/or eliminates unauthorized use of a voice-based digital assistant.

Further, for example, the Artificial Neural Network (ANN) can be trained to classify the mode of conversation in which the words spoken by the specific person are recognized. The mode can include a classification of the emotional state in speaking the words, a classification of whether the conversation is directed to the voice-based digital assistant, and/or a classification of a context of conversation. The microphone can be configured to generate the text output when the mode is in one or more predefined categories and suppress the text output when the mode is in other categories.

In another example, the Artificial Neural Network (ANN) can be trained to monitor audio data to detect a predetermined pattern. For example, the microphone configured with such an Artificial Neural Network (ANN) can be used to monitor the breathing of a patient to detect the onset of a symptom, or to monitor the noises in a room to detect a fall without eavesdropping conversations in the room. Thus, the Artificial Neural Network (ANN) converts the microphone into a special purpose sensor that detects a predefined categories of events based on sound waves associated with the events. The detected events can be transmitted to a computer system that uses the microphone as an input device. Such a computer system can be a mobile computer, a smart phone, a personal media player, a personal computer, a server computer, or a cluster of server computers.

Optionally, the microphone can be configured to store the audio data for a period time. For example, when an unrecognized pattern of sound is detected, the microphone may report the detection of the unrecognized pattern to a digital assistant. The digital assistant may interact with a user and/or analysis other inputs to determine whether to request the audio data of the unrecognized pattern of sound, such as words spoken by an unknown persons. With explicit authorization from the user, the audio data of the unrecognized pattern of sound can be transmitted to a separate computer, such as a server computer, or a cloud computing platform, for further analysis. The analysis result can be provided to the microphone to further train the Artificial Neural Network (ANN) implemented in the microphone to improve its inference capability. For example, the training can be performed using a supervised machine learning technique. For example, the further analysis can be performed by a human operator, or an authorized user. For example, an alternative user interface (e.g., presented using a smartphone, a personal media player, a tablet computer, a mobile computer) can be used to identify the nature of the unrecognized pattern of sound such that the Artificial Neural Network (ANN) can be subsequently trained to identify the pattern of sound in a way similar to the human operator, or the authorized user.

Optionally, the microphone can store for a predetermined period of time a segment of audio data stream that has been converted into a summary or description of the sound recognized in the audio data stream. The audio data stream can be annotated with the summary or description and identifications of portions of recognized audio events, such as spoken words, recognized sound and events, etc. The summary or description of the audio data can be provided as the output of the microphone to an application running in a separate computer, such as a smartphone, a personal media player, a mobile computer, a personal computer, a hub of Internet of Things (IoTs), and/or a server computer. Within the predetermined period of time, an application receiving the summary or description as input can select an event of interest and optionally request the microphone to transmit the relevant audio data of the event for storing and/or for further analysis.

In some applications, the microphone is configured to monitor the audio stream for features and/or events satisfying predetermined selection criteria. When such features and/or events are detected in the output of the Artificial Neural Network (ANN), the microphone selects representative portions from the audio stream for storing and/or for uploading to a separate computer. Through the analysis performed by the Artificial Neural Network (ANN), the information in the audio stream can be compressed into a summary that includes the identifications of the features/events of interest, audio data of the features/events, and a description of recognized/measured attributes of the features/events. Information on recognized features that are not of interest can be reduced and/or discard. Such a summary of the audio stream can achieve a compression ratio better than conventional lossy or lossless audio compression techniques; and in many applications of a microphone, such a summary can be sufficient and/or more useful than the original audio stream generated by the transducer of the microphone.

For example, instead of transmitting the audio stream to a separate computer system for processing, the microphone can provide a description of the content in the audio stream to the computer system for processing. The representative clips of the recognized features or events can be transmitted with the description, or provided when the computer system sends a request for such clips. Further, the computer system may optionally request the microphone to transmit a clip of audio data that contains a feature or event of interest.

For example, a microphone is configured to monitor the health condition of a user based the breathing sound of the user, the coughing sound of the user, and/or other non-speech sounds made by the user. An integrated circuit device having a Deep Learning Accelerator and random access memory is configured in the microphone to process audio data locally. Sound clips of the user determined to be not associated with health concerns can be discarded automatically to reduce the need to store a large amount of raw audio data and to protect the privacy of the user.

The microphone can be customized for a particular application of intelligent monitoring by storing a model of an Artificial Neural Network (ANN) executable by the Deep Learning Accelerator (DLA). For example, the model can be converted from a description of the Artificial Neural Network (ANN) using a compiler; and the model includes weight/kernel matrices of the Artificial Neural Network (ANN) and instructions with matrix operands, executable by the Deep Learning Accelerator (DLA) to implement the computation of the Artificial Neural Network (ANN) based on the weight/kernel matrices.

For example, a microphone can be configured in a health care facility to monitor the conditions of a patients. Different patients can have different health issues that require the monitoring for the detection of the onset of different symptoms. Thus, a microphone can be customized for the patient currently being monitored by installing a model of an Artificial Neural Network (ANN) trained for the detection of symptoms relevant to the patient.

After the microphone is customized through storing the model in the random access memory to perform the computations of the Artificial Neural Network (ANN), the raw audio data generated by the microphone is provided as input to the Artificial Neural Network (ANN); and the outputs of the Artificial Neural Network (ANN) can be used to generate alerts, to selectively retain and/or report audio data, and/or be provided as the primary output of the microphone.

For example, the microphone can include a wireless transceiver (e.g., a communication device for a wireless personal area network, such as a Bluetooth transceiver, or a communication device for a wireless local area network, such as a Wi-Fi transceiver). Through a wireless connection, the output of the Artificial Neural Network (ANN) can be reported to a separate computer system, such as a smartphone, a personal media player, a mobile computer, a personal computer, a hub of Internet of Things (IoTs), and/or a server computer.

Alternatively, the microphone can have a cable for a wired connection to a separate computer system to report the output of the Artificial Neural Network (ANN) or download the outputs stored in the microphone over a period of time.

For example, the Artificial Neural Network (ANN) can be trained to classify whether a sound clip is of interest to a specific application. The output of the Artificial Neural Network (ANN) can be used to selectively store audio data of the clip for subsequent analysis and/or downloading.

For example, the microphone can provide, to a computer system and without assistance from the computer system, intelligent outputs that are generated locally in the microphone using the Artificial Neural Network (ANN). For example, the microphone can be used to monitor for a health related event and generate an alert when such an event is detected. For example, the microphone can be used to monitor for indications related to the diagnosis of a health problem and record occurrences of such indications and/or associated data for further analysis. For example, the microphone can be used to monitor the user for a fall and generate a call for assistance when detecting that the user is falling. For example, the microphone can be used to detect a voice command of the user and provide the identification of the voice command to a separate computer (e.g., a smartphone, a game console, a personal media player, a personal computer, a set top box), to control an operation in the separate computer.

The random access memory in the microphone can include a portion configured to store input to the Artificial Neural Network (ANN) and another portion configured to store output from the Artificial Neural Network (ANN). The audio data generated by the microphone can be stored in a cyclic way in the input portion of the random access memory. Thus, the raw audio data for the latest period of the operation of the microphone can be found in the input portion of the random access memory. The Deep Learning Accelerator (DLA) can convert in real time, the audio data in the input portion into inference results stored in the output portion of the random access memory.

For example, a stream of audio data to the Artificial Neural Network (ANN) can be configured in the form of a sequence of input data sets. Each input data set is for a set of input to the Artificial Neural Network (ANN) during a time slot. While the Deep Learning Accelerator (DLA) is computing the output from the current set of input, a controller can store the next set of input into the random access memory; and the controller can concurrently retrieve, from the random access memory, the output generated for the previous set of input.

Thus, the task of preparation and processing of audio data to an Artificial Neural Network (ANN) can be performed locally on the microphone to reduce data transmitted to a separate computer system. Such an arrangement can reduce the power consumption associated with transmitting a large amount of sensor data from the microphone and improve privacy protection for the user of the microphone.

Further, neuromorphic memory can be used to implement the computations of matrix/vector multiplication and summation to reduce power consumption of the Deep Learning Accelerator (DLA).

For example, neuromorphic memory can be implemented using a crossbar array of memristors that are configured to perform the Multiply-and-Accumulate (MAC) operations via analog circuitry. Electric currents going through the wordlines through a set of memristors in the crossbar array to a bitline are summed in the bitline, which corresponds to the accumulation operation. The electric currents correspond to the multiplication of the voltages applied on the wordlines and parameters associated with the resistances of the memristors, which corresponds to the multiplication operations. The current in the bitline can be compared with a threshold to determine whether a neuron represented by the bitline is activated under the current input. An array of memristors can be connected to the bitlines respectively and programmed to have thresholds corresponding to the activation level thresholds of the neurons. A current detector can be configured for each memristor connected to the output of a bitline to determine whether the level of electric current in the bitline corresponding to a level that exceeds the threshold of the memristor.

FIG. 1 shows an integrated circuit device (101) having a Deep Learning Accelerator (103) and random access memory (105) configured according to one embodiment.

The Deep Learning Accelerator (103) in FIG. 1 includes processing units (111), a control unit (113), and local memory (115). When vector and matrix operands are in the local memory (115), the control unit (113) can use the processing units (111) to perform vector and matrix operations in accordance with instructions. Further, the control unit (113) can load instructions and operands from the random access memory (105) through a memory interface (117) and a high speed/bandwidth connection (119).

The integrated circuit device (101) is configured to be enclosed within an integrated circuit package with pins or contacts for a memory controller interface (107).

The memory controller interface (107) is configured to support a standard memory access protocol such that the integrated circuit device (101) appears to a typical memory controller in a way same as a conventional random access memory device having no Deep Learning Accelerator (DLA) (103). For example, a memory controller external to the integrated circuit device (101) can access, using a standard memory access protocol through the memory controller interface (107), the random access memory (105) in the integrated circuit device (101).

The integrated circuit device (101) is configured with a high bandwidth connection (119) between the random access memory (105) and the Deep Learning Accelerator (DLA) (103) that are enclosed within the integrated circuit device (101). The bandwidth of the connection (119) is higher than the bandwidth of the connection (109) between the random access memory (105) and the memory controller interface (107).

In one embodiment, both the memory controller interface (107) and the memory interface (117) are configured to access the random access memory (105) via a same set of buses or wires. Thus, the bandwidth to access the random access memory (105) is shared between the memory interface (117) and the memory controller interface (107). Alternatively, the memory controller interface (107) and the memory interface (117) are configured to access the random access memory (105) via separate sets of buses or wires. Optionally, the random access memory (105) can include multiple sections that can be accessed concurrently via the connection (119). For example, when the memory interface (117) is accessing a section of the random access memory (105), the memory control interface (107) can concurrently access another section of the random access memory (105). For example, the different sections can be configured on different integrated circuit dies and/or different planes/banks of memory cells; and the different sections can be accessed in parallel to increase throughput in accessing the random access memory (105). For example, the memory controller interface (107) is configured to access one data unit of a predetermined size at a time; and the memory interface (117) is configured to access multiple data units, each of the same predetermined size, at a time.

In one embodiment, the random access memory (105) and the integrated circuit device (101) are configured on different integrated circuit dies configured within a same integrated circuit package. Further, the random access memory (105) can be configured on one or more integrated circuit dies that allows parallel access of multiple data elements concurrently.

In some implementations, the number of data elements of a vector or matrix that can be accessed in parallel over the connection (119) corresponds to the granularity of the Deep Learning Accelerator (DLA) operating on vectors or matrices. For example, when the processing units (111) can operate on a number of vector/matrix elements in parallel, the connection (119) is configured to load or store the same number, or multiples of the number, of elements via the connection (119) in parallel.

Optionally, the data access speed of the connection (119) can be configured based on the processing speed of the Deep Learning Accelerator (DLA) (103). For example, after an amount of data and instructions have been loaded into the local memory (115), the control unit (113) can execute an instruction to operate on the data using the processing units (111) to generate output. Within the time period of processing to generate the output, the access bandwidth of the connection (119) allows the same amount of data and instructions to be loaded into the local memory (115) for the next operation and the same amount of output to be stored back to the random access memory (105). For example, while the control unit (113) is using a portion of the local memory (115) to process data and generate output, the memory interface (117) can offload the output of a prior operation into the random access memory (105) from, and load operand data and instructions into, another portion of the local memory (115). Thus, the utilization and performance of the Deep Learning Accelerator (DLA) are not restricted or reduced by the bandwidth of the connection (119).

The random access memory (105) can be used to store the model data of an Artificial Neural Network (ANN) and to buffer input data for the Artificial Neural Network (ANN). The model data does not change frequently. The model data can include the output generated by a compiler for the Deep Learning Accelerator (DLA) to implement the Artificial Neural Network (ANN). The model data typically includes matrices used in the description of the Artificial Neural Network (ANN) and instructions generated for the Deep Learning Accelerator (DLA) (103) to perform vector/matrix operations of the Artificial Neural Network (ANN) based on vector/matrix operations of the granularity of the Deep Learning Accelerator (DLA) (103). The instructions operate not only on the vector/matrix operations of the Artificial Neural Network (ANN), but also on the input data for the Artificial Neural Network (ANN).

In one embodiment, when the input data is loaded or updated in the random access memory (105), the control unit (113) of the Deep Learning Accelerator (DLA) (103) can automatically execute the instructions for the Artificial Neural Network (ANN) to generate an output of the Artificial Neural Network (ANN). The output is stored into a predefined region in the random access memory (105). The Deep Learning Accelerator (DLA) (103) can execute the instructions without help from a Central Processing Unit (CPU). Thus, communications for the coordination between the Deep Learning Accelerator (DLA) (103) and a processor outside of the integrated circuit device (101) (e.g., a Central Processing Unit (CPU)) can be reduced or eliminated.

Optionally, the logic circuit of the Deep Learning Accelerator (DLA) (103) can be implemented via Complementary Metal Oxide Semiconductor (CMOS). For example, the technique of CMOS Under the Array (CUA) of memory cells of the random access memory (105) can be used to implement the logic circuit of the Deep Learning Accelerator (DLA) (103), including the processing units (111) and the control unit (113). Alternatively, the technique of CMOS in the Array of memory cells of the random access memory (105) can be used to implement the logic circuit of the Deep Learning Accelerator (DLA) (103).

In some implementations, the Deep Learning Accelerator (DLA) (103) and the random access memory (105) can be implemented on separate integrated circuit dies and connected using Through-Silicon Vias (TSV) for increased data bandwidth between the Deep Learning Accelerator (DLA) (103) and the random access memory (105). For example, the Deep Learning Accelerator (DLA) (103) can be formed on an integrated circuit die of a Field-Programmable Gate Array (FPGA) or Application Specific Integrated circuit (ASIC).

Alternatively, the Deep Learning Accelerator (DLA) (103) and the random access memory (105) can be configured in separate integrated circuit packages and connected via multiple point-to-point connections on a printed circuit board (PCB) for parallel communications and thus increased data transfer bandwidth.

The random access memory (105) can be volatile memory or non-volatile memory, or a combination of volatile memory and non-volatile memory. Examples of non-volatile memory include flash memory, memory cells formed based on negative-and (NAND) logic gates, negative-or (NOR) logic gates, Phase-Change Memory (PCM), magnetic memory (MRAM), resistive random-access memory, cross point storage and memory devices. A cross point memory device can use transistor-less memory elements, each of which has a memory cell and a selector that are stacked together as a column. Memory element columns are connected via two layers of wires running in perpendicular directions, where wires of one layer run in one direction in the layer that is located above the memory element columns, and wires of the other layer run in another direction and are located below the memory element columns. Each memory element can be individually selected at a cross point of one wire on each of the two layers. Cross point memory devices are fast and non-volatile and can be used as a unified memory pool for processing and storage. Further examples of non-volatile memory include Read-Only Memory (ROM), Programmable Read-Only Memory (PROM), Erasable Programmable Read-Only Memory (EPROM) and Electronically Erasable Programmable Read-Only Memory (EEPROM) memory, etc. Examples of volatile memory include Dynamic Random-Access Memory (DRAM) and Static Random-Access Memory (SRAM).

For example, non-volatile memory can be configured to implement at least a portion of the random access memory (105). The non-volatile memory in the random access memory (105) can be used to store the model data of an Artificial Neural Network (ANN). Thus, after the integrated circuit device (101) is powered off and restarts, it is not necessary to reload the model data of the Artificial Neural Network (ANN) into the integrated circuit device (101). Further, the non-volatile memory can be programmable/rewritable. Thus, the model data of the Artificial Neural Network (ANN) in the integrated circuit device (101) can be updated or replaced to implement an update Artificial Neural Network (ANN), or another Artificial Neural Network (ANN).

The processing units (111) of the Deep Learning Accelerator (DLA) (103) can include vector-vector units, matrix-vector units, and/or matrix-matrix units. Examples of units configured to perform for vector-vector operations, matrix-vector operations, and matrix-matrix operations are discussed below in connection with FIGS. 2-4.

Figure 2:
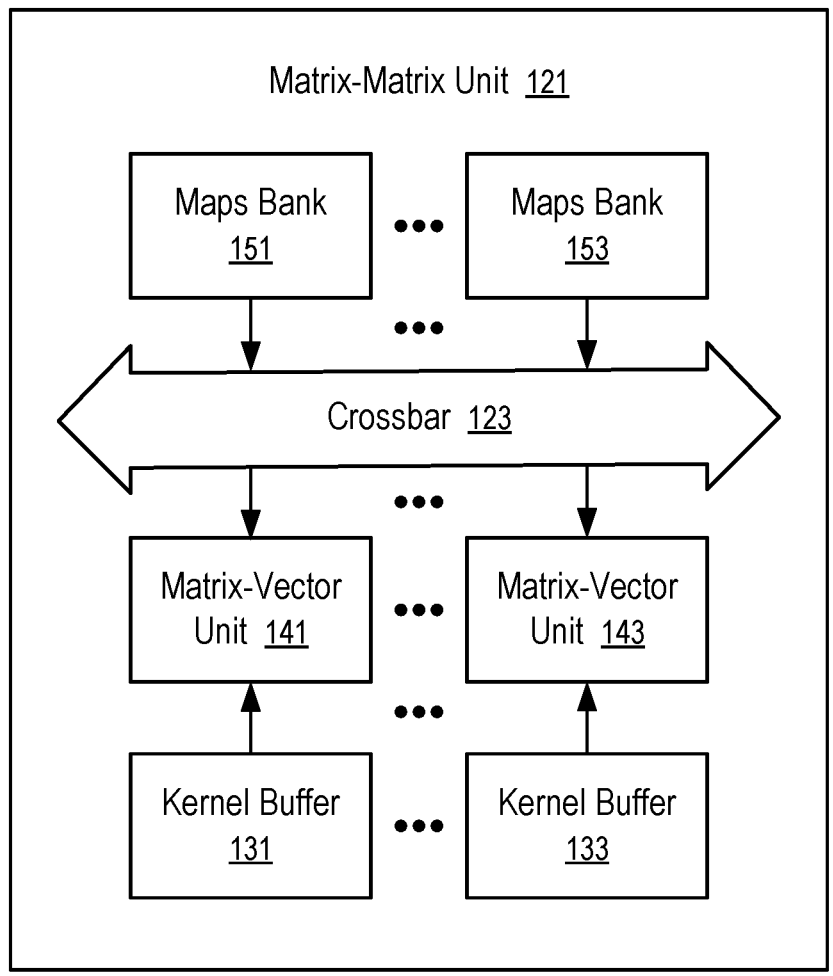
FIG. 2 shows a processing unit configured to perform matrix-matrix operations according to one embodiment.

FIG. 2 shows a processing unit (121) configured to perform matrix-matrix operations according to one embodiment. For example, the matrix-matrix unit (121) of FIG. 2 can be used as one of the processing units (111) of the Deep Learning Accelerator (DLA) (103) of FIG. 1.

In FIG. 2, the matrix-matrix unit (121) includes multiple kernel buffers (131 to 133) and multiple the maps banks (151 to 153). Each of the maps banks (151 to 153) stores one vector of a matrix operand that has multiple vectors stored in the maps banks (151 to 153) respectively; and each of the kernel buffers (131 to 133) stores one vector of another matrix operand that has multiple vectors stored in the kernel buffers (131 to 133) respectively. The matrix-matrix unit (121) is configured to perform multiplication and accumulation operations on the elements of the two matrix operands, using multiple matrix-vector units (141 to 143) that operate in parallel.

A crossbar (123) connects the maps banks (151 to 153) to the matrix-vector units (141 to 143). The same matrix operand stored in the maps bank (151 to 153) is provided via the crossbar (123) to each of the matrix-vector units (141 to 143); and the matrix-vector units (141 to 143) receives data elements from the maps banks (151 to 153) in parallel. Each of the kernel buffers (131 to 133) is connected to a respective one in the matrix-vector units (141 to 143) and provides a vector operand to the respective matrix-vector unit. The matrix-vector units (141 to 143) operate concurrently to compute the operation of the same matrix operand, stored in the maps banks (151 to 153) multiplied by the corresponding vectors stored in the kernel buffers (131 to 133). For example, the matrix-vector unit (141) performs the multiplication operation on the matrix operand stored in the maps banks (151 to 153) and the vector operand stored in the kernel buffer (131), while the matrix-vector unit (143) is concurrently performing the multiplication operation on the matrix operand stored in the maps banks (151 to 153) and the vector operand stored in the kernel buffer (133).

Figure 3:
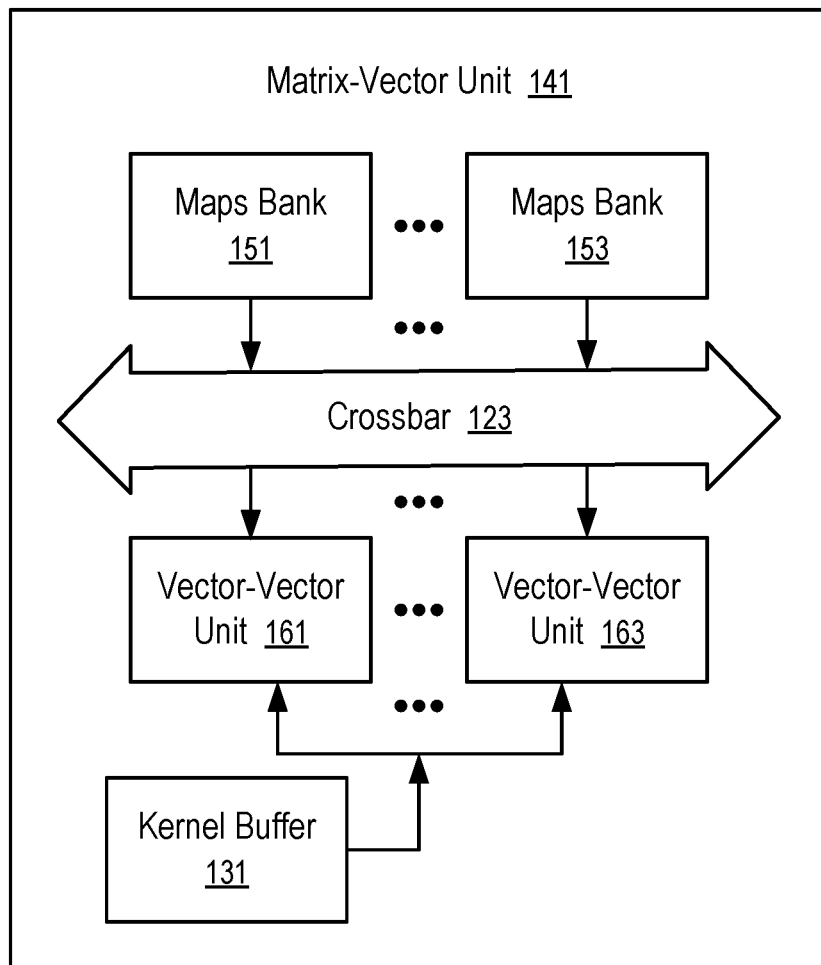
FIG. 3 shows a processing unit configured to perform matrix-vector operations according to one embodiment.

Each of the matrix-vector units (141 to 143) in FIG. 2 can be implemented in a way as illustrated in FIG. 3.

FIG. 3 shows a processing unit (141) configured to perform matrix-vector operations according to one embodiment. For example, the matrix-vector unit (141) of FIG. 3 can be used as any of the matrix-vector units in the matrix-matrix unit (121) of FIG. 2.

In FIG. 3, each of the maps banks (151 to 153) stores one vector of a matrix operand that has multiple vectors stored in the maps banks (151 to 153) respectively, in a way similar to the maps banks (151 to 153) of FIG. 2. The crossbar (123) in FIG. 3 provides the vectors from the maps banks (151) to the vector-vector units (161 to 163) respectively. A same vector stored in the kernel buffer (131) is provided to the vector-vector units (161 to 163).

The vector-vector units (161 to 163) operate concurrently to compute the operation of the corresponding vector operands, stored in the maps banks (151 to 153) respectively, multiplied by the same vector operand that is stored in the kernel buffer (131). For example, the vector-vector unit (161) performs the multiplication operation on the vector operand stored in the maps bank (151) and the vector operand stored in the kernel buffer (131), while the vector-vector unit (163) is concurrently performing the multiplication operation on the vector operand stored in the maps bank (153) and the vector operand stored in the kernel buffer (131).

When the matrix-vector unit (141) of FIG. 3 is implemented in a matrix-matrix unit (121) of FIG. 2, the matrix-vector unit (141) can use the maps banks (151 to 153), the crossbar (123) and the kernel buffer (131) of the matrix-matrix unit (121).

Figure 4:
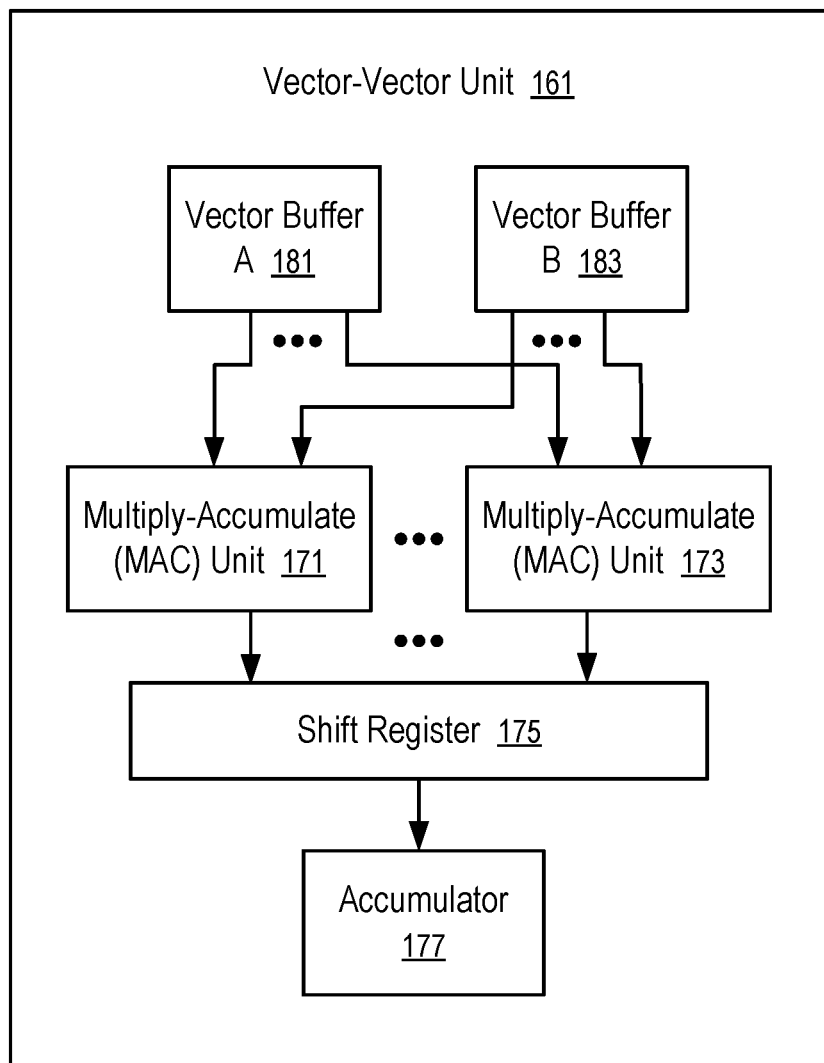
FIG. 4 shows a processing unit configured to perform vector-vector operations according to one embodiment.

Each of the vector-vector units (161 to 163) in FIG. 3 can be implemented in a way as illustrated in FIG. 4.

FIG. 4 shows a processing unit (161) configured to perform vector-vector operations according to one embodiment. For example, the vector-vector unit (161) of FIG. 4 can be used as any of the vector-vector units in the matrix-vector unit (141) of FIG. 3.

In FIG. 4, the vector-vector unit (161) has multiple multiply-accumulate (MAC) units (171 to 173). Each of the multiply-accumulate (MAC) units (171 to 173) can receive two numbers as operands, perform multiplication of the two numbers, and add the result of the multiplication to a sum maintained in the multiply-accumulate (MAC) unit.

Each of the vector buffers (181 and 183) stores a list of numbers. A pair of numbers, each from one of the vector buffers (181 and 183), can be provided to each of the multiply-accumulate (MAC) units (171 to 173) as input. The multiply-accumulate (MAC) units (171 to 173) can receive multiple pairs of numbers from the vector buffers (181 and 183) in parallel and perform the multiply-accumulate (MAC) operations in parallel. The outputs from the multiply-accumulate (MAC) units (171 to 173) are stored into the shift register (175); and an accumulator (177) computes the sum of the results in the shift register (175).

When the vector-vector unit (161) of FIG. 4 is implemented in a matrix-vector unit (141) of FIG. 3, the vector-vector unit (161) can use a maps bank (e.g., 151 or 153) as one vector buffer (181), and the kernel buffer (131) of the matrix-vector unit (141) as another vector buffer (183).

The vector buffers (181 and 183) can have a same length to store the same number/count of data elements. The length can be equal to, or the multiple of, the count of multiply-accumulate (MAC) units (171 to 173) in the vector-vector unit (161). When the length of the vector buffers (181 and 183) is the multiple of the count of multiply-accumulate (MAC) units (171 to 173), a number of pairs of inputs, equal to the count of the multiply-accumulate (MAC) units (171 to 173), can be provided from the vector buffers (181 and 183) as inputs to the multiply-accumulate (MAC) units (171 to 173) in each iteration; and the vector buffers (181 and 183) feed their elements into the multiply-accumulate (MAC) units (171 to 173) through multiple iterations.

In one embodiment, the communication bandwidth of the connection (119) between the Deep Learning Accelerator (DLA) (103) and the random access memory (105) is sufficient for the matrix-matrix unit (121) to use portions of the random access memory (105) as the maps banks (151 to 153) and the kernel buffers (131 to 133).

In another embodiment, the maps banks (151 to 153) and the kernel buffers (131 to 133) are implemented in a portion of the local memory (115) of the Deep Learning Accelerator (DLA) (103). The communication bandwidth of the connection (119) between the Deep Learning Accelerator (DLA) (103) and the random access memory (105) is sufficient to load, into another portion of the local memory (115), matrix operands of the next operation cycle of the matrix-matrix unit (121), while the matrix-matrix unit (121) is performing the computation in the current operation cycle using the maps banks (151 to 153) and the kernel buffers (131 to 133) implemented in a different portion of the local memory (115) of the Deep Learning Accelerator (DLA) (103).

Figure 5:
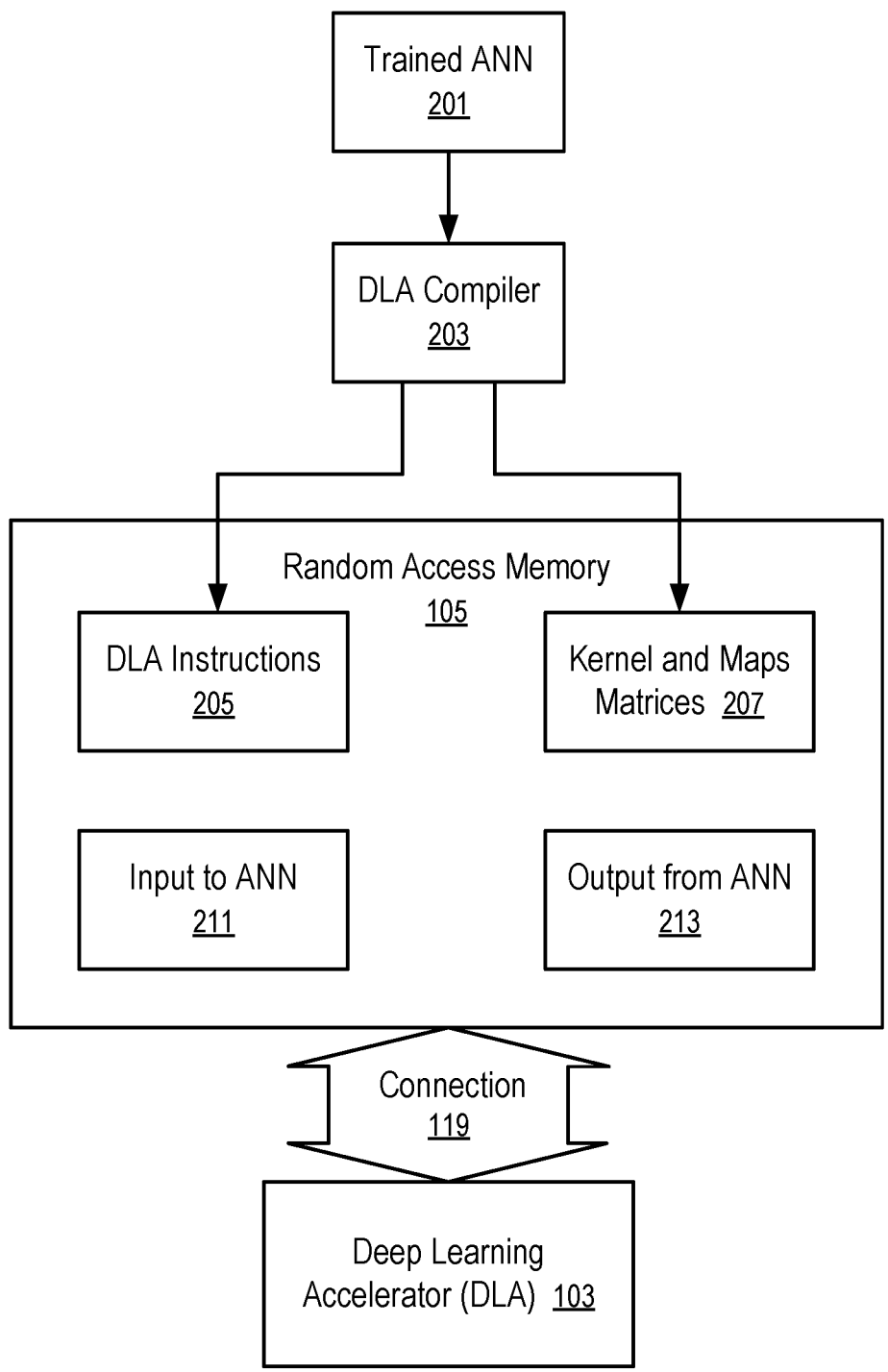
FIG. 5 shows a Deep Learning Accelerator and random access memory configured to autonomously apply inputs to a trained Artificial Neural Network according to one embodiment.

FIG. 5 shows a Deep Learning Accelerator and random access memory configured to autonomously apply inputs to a trained Artificial Neural Network according to one embodiment.

An Artificial Neural Network (ANN) (201) that has been trained through machine learning (e.g., deep learning) can be described in a standard format (e.g., Open Neural Network Exchange (ONNX)). The description of the trained ANN (201) in the standard format identifies the properties of the artificial neurons and their connectivity.

In FIG. 5, a Deep Learning Accelerator (DLA) compiler (203) converts trained ANN (201) by generating instructions (205) for a Deep Learning Accelerator (DLA) (103) and matrices (207) corresponding to the properties of the artificial neurons and their connectivity. The instructions (205) and the matrices (207) generated by the DLA compiler (203) from the trained ANN (201) can be stored in random access memory (105) for the Deep Learning Accelerator (DLA) (103).

For example, the random access memory (105) and the Deep Learning Accelerator (DLA) (103) can be connected via a high bandwidth connection (119) in a way as in the integrated circuit device (101) of FIG. 1. The autonomous computation of FIG. 5 based on the instructions (205) and the matrices (207) can be implemented in the integrated circuit device (101) of FIG. 1. Alternatively, the random access memory (105) and the Deep Learning Accelerator (DLA) (103) can be configured on a printed circuit board with multiple point to point serial buses running in parallel to implement the connection (119).

In FIG. 5, after the results of the DLA compiler (203) are stored in the random access memory (105), the application of the trained ANN (201) to process an input (211) to the trained ANN (201) to generate the corresponding output (213) of the trained ANN (201) can be triggered by the presence of the input (211) in the random access memory (105), or another indication provided in the random access memory (105).

In response, the Deep Learning Accelerator (DLA) (103) executes the instructions (205) to combine the input (211) and the matrices (207). The execution of the instructions (205) can include the generation of maps matrices for the maps banks (151 to 153) of one or more matrix-matrix units (e.g., 121) of the Deep Learning Accelerator (DLA) (103).

In some embodiments, the inputs to ANN (211) is in the form of an initial maps matrix. Portions of the initial maps matrix can be retrieved from the random access memory (105) as the matrix operand stored in the maps banks (151 to 153) of a matrix-matrix unit (121). Alternatively, the DLA instructions (205) also include instructions for the Deep Learning Accelerator (DLA) (103) to generate the initial maps matrix from the input (211).

According to the DLA instructions (205), the Deep Learning Accelerator (DLA) (103) loads matrix operands into the kernel buffers (131 to 133) and maps banks (151 to 153) of its matrix-matrix unit (121). The matrix-matrix unit (121) performs the matrix computation on the matrix operands. For example, the DLA instructions (205) break down matrix computations of the trained ANN (201) according to the computation granularity of the Deep Learning Accelerator (DLA) (103) (e.g., the sizes/dimensions of matrices that loaded as matrix operands in the matrix-matrix unit (121)) and applies the input feature maps to the kernel of a layer of artificial neurons to generate output as the input for the next layer of artificial neurons.

Upon completion of the computation of the trained ANN (201) performed according to the instructions (205), the Deep Learning Accelerator (DLA) (103) stores the output (213) of the ANN (201) at a pre-defined location in the random access memory (105), or at a location specified in an indication provided in the random access memory (105) to trigger the computation.

When the technique of FIG. 5 is implemented in the integrated circuit device (101) of FIG. 1, an external device connected to the memory controller interface (107) can write the input (211) into the random access memory (105) and trigger the autonomous computation of applying the input (211) to the trained ANN (201) by the Deep Learning Accelerator (DLA) (103). After a period of time, the output (213) is available in the random access memory (105); and the external device can read the output (213) via the memory controller interface (107) of the integrated circuit device (101).

For example, a predefined location in the random access memory (105) can be configured to store an indication to trigger the autonomous execution of the instructions (205) by the Deep Learning Accelerator (DLA) (103). The indication can optionally include a location of the input (211) within the random access memory (105). Thus, during the autonomous execution of the instructions (205) to process the input (211), the external device can retrieve the output generated during a previous run of the instructions (205), and/or store another set of input for the next run of the instructions (205).

Optionally, a further predefined location in the random access memory (105) can be configured to store an indication of the progress status of the current run of the instructions (205). Further, the indication can include a prediction of the completion time of the current run of the instructions (205) (e.g., estimated based on a prior run of the instructions (205)). Thus, the external device can check the completion status at a suitable time window to retrieve the output (213).

In some embodiments, the random access memory (105) is configured with sufficient capacity to store multiple sets of inputs (e.g., 211) and outputs (e.g., 213). Each set can be configured in a predetermined slot/area in the random access memory (105).

The Deep Learning Accelerator (DLA) (103) can execute the instructions (205) autonomously to generate the output (213) from the input (211) according to matrices (207) stored in the random access memory (105) without helps from a processor or device that is located outside of the integrated circuit device (101).

In a method according to one embodiment, random access memory (105) of a computing device (e.g., 101) can be accessed using an interface (107) of the computing device (e.g., 101) to a memory controller. The computing device (e.g., 101) can have processing units (e.g., 111) configured to perform at least computations on matrix operands, such as a matrix operand stored in maps banks (151 to 153) and a matrix operand stored in kernel buffers (131 to 133).

For example, the computing device (e.g., 101) can be enclosed within an integrated circuit package; and a set of connections can connect the interface (107) to the memory controller that is located outside of the integrated circuit package.

Instructions (205) executable by the processing units (e.g., 111) can be written into the random access memory (105) through the interface (107).

Matrices (207) of an Artificial Neural Network (201) can be written into the random access memory (105) through the interface (107). The matrices (207) identify the property and/or state of the Artificial Neural Network (201).

Optionally, at least a portion of the random access memory (105) is non-volatile and configured to store the instructions (205) and the matrices (207) of the Artificial Neural Network (201).

First input (211) to the Artificial Neural Network can be written into the random access memory (105) through the interface (107).

An indication is provided in the random access memory (105) to cause the processing units (111) to start execution of the instructions (205). In response to the indication, the processing units (111) execute the instructions to combine the first input (211) with the matrices (207) of the Artificial Neural Network (201) to generate first output (213) from the Artificial Neural Network (201) and store the first output (213) in the random access memory (105).

For example, the indication can be an address of the first input (211) in the random access memory (105); and the indication can be stored a predetermined location in the random access memory (105) to cause the initiation of the execution of the instructions (205) for the input (211) identified by the address. Optionally, the indication can also include an address for storing the output (213).

The first output (213) can be read, through the interface (107), from the random access memory (105).

For example, the computing device (e.g., 101) can have a Deep Learning Accelerator (103) formed on a first integrated circuit die and the random access memory (105) formed on one or more second integrated circuit dies. The connection (119) between the first integrated circuit die and the one or more second integrated circuit dies can include Through-Silicon Vias (TSVs) to provide high bandwidth for memory access.

For example, a description of the Artificial Neural Network (201) can be converted using a compiler (203) into the instructions (205) and the matrices (207). The combination of the instructions (205) and the matrices (207) stored in the random access memory (105) and the Deep Learning Accelerator (103) provides an autonomous implementation of the Artificial Neural Network (201) that can automatically convert input (211) to the Artificial Neural Network (201) to its output (213).

For example, during a time period in which the Deep Learning Accelerator (103) executes the instructions (205) to generate the first output (213) from the first input (211) according to the matrices (207) of the Artificial Neural Network (201), the second input to Artificial Neural Network (201) can be written into the random access memory (105) through the interface (107) at an alternative location. After the first output (213) is stored in the random access memory (105), an indication can be provided in the random access memory to cause the Deep Learning Accelerator (103) to again start the execution of the instructions and generate second output from the second input.

During the time period in which the Deep Learning Accelerator (103) executes the instructions (205) to generate the second output from the second input according to the matrices (207) of the Artificial Neural Network (201), the first output (213) can be read from the random access memory (105) through the interface (107); and a further input can be written into the random access memory to replace the first input (211), or written at a different location. The process can be repeated for a sequence of inputs.

The Deep Learning Accelerator (103) can include at least one matrix-matrix unit (121) that can execute an instruction on two matrix operands. The two matrix operands can be a first matrix and a second matrix. Each of two matrices has a plurality of vectors. The matrix-matrix unit (121) can include a plurality of matrix-vector units (141 to 143) configured to operate in parallel. Each of the matrix-vector units (141 to 143) are configured to operate, in parallel with other matrix-vector units, on the first matrix and one vector from second matrix. Further, each of the matrix-vector units (141 to 143) can have a plurality of vector-vector units (161 to 163) configured to operate in parallel. Each of the vector-vector units (161 to 163) is configured to operate, in parallel with other vector-vector units, on a vector from the first matrix and a common vector operand of the corresponding matrix-vector unit. Further, each of the vector-vector units (161 to 163) can have a plurality of multiply-accumulate units (171 to 173) configured to operate in parallel.

The Deep Learning Accelerator (103) can have local memory (115) and a control unit (113) in addition to the processing units (111). The control unit (113) can load instructions (205) and matrix operands (e.g., 207) from the random access memory (105) for execution by the processing units (111). The local memory can cache matrix operands used by the matrix-matrix unit. The connection (119) can be configured with a bandwidth sufficient to load a set of matrix operands from the random access memory (105) to the local memory (115) during a time period in which the matrix-matrix unit performs operations on two other matrix operands. Further, during the time period, the bandwidth is sufficient to store a result, generated by the matrix-matrix unit (121) in a prior instruction execution, from the local memory (115) to the random access memory (105).

The Deep Learning Accelerator (103) and the random access memory (105) can be configured in a microphone to convert audio data into inference results that are recognized by an Artificial Neural Network from the audio data. For example, the microphone can be used to monitor the speech and sounds produced by a user to generate commands, text input, alerts and/or selectively store audio data.

For example, the microphone can have a transceiver for a wired or wireless communication connection to a separate computer system such as a voice-based digital assistant, a smart speaker, a smart television, a smart appliance, a smart Internet of Things (IoT) device, a mobile device, a smartphone, a personal media player, a personal computer, a set top box, a hub of Internet of Things (IoT), a server computer, etc.

The microphone can use the connection to provide words spoken by a particular user as commands and/or text inputs, to provide identifications of recognized sound patterns or events that are identified by an Artificial Neural Network (201). The separate computer system further processes the commands, text inputs, the occurrence of the sound patterns or events, to generate user interactions, to generate an alert, to provide a display, to selective request audio data from the microphone, and/or to selectively store audio data.

The microphone is customizable, updatable, and/or upgradable via receiving, through the transceiver and storing into the random access memory (105), the matrices (207) and instructions (205) of an Artificial Neural Network (201).

The Artificial Neural Network (201), implemented via the Deep Learning Accelerator (103) executing the instructions (205), converts the audio stream of sounds detected by a transducer into inference results. The conversion improves the quality of outputs of the microphone, reduces the communication bandwidth requirement for the connection to the computer system, and/or reduces the computation workloads of the computer system.

Figure 6:
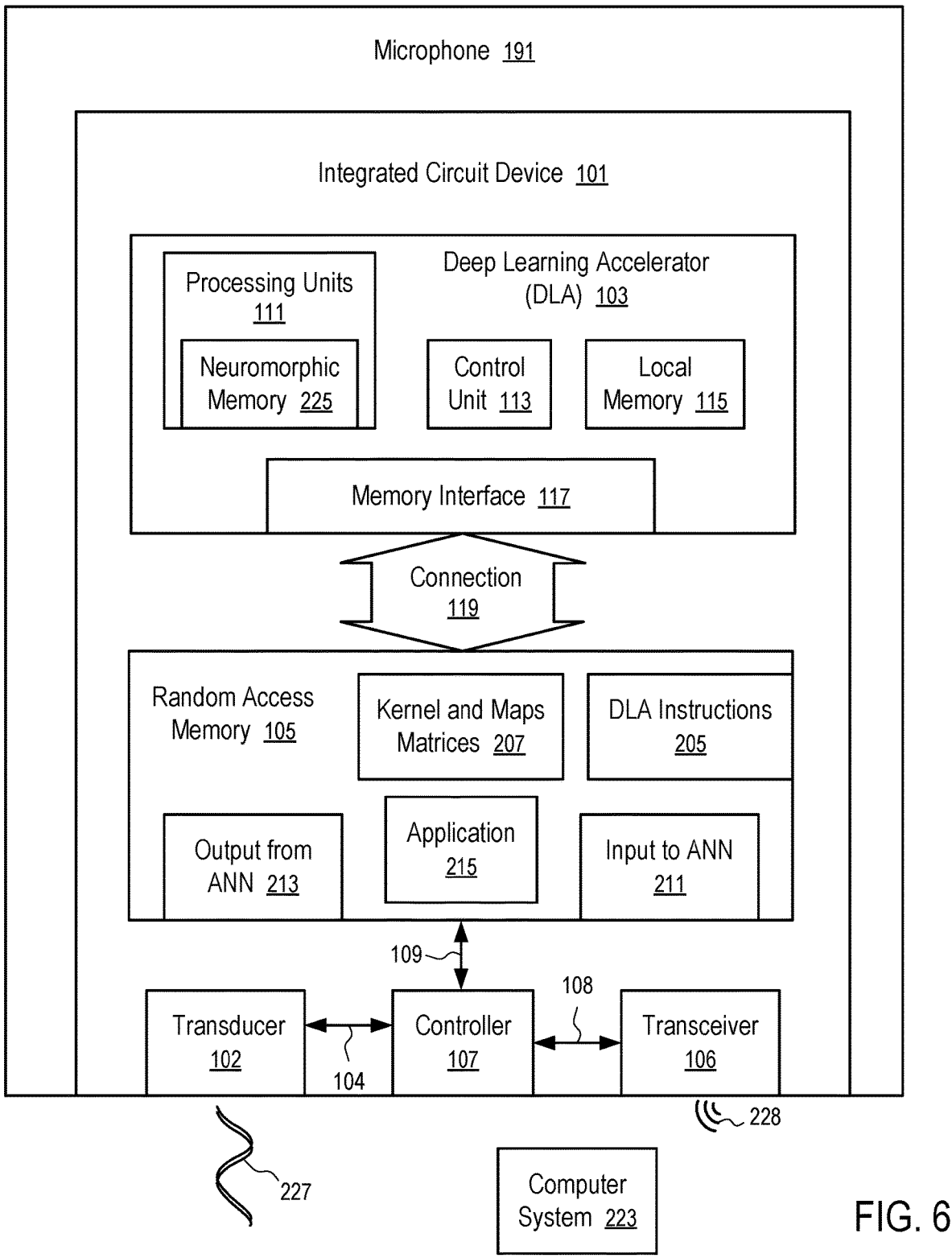
FIGS. 6-8 illustrate microphones having a Deep Learning Accelerator and random access memory configured according to some embodiments.
Figure 7:
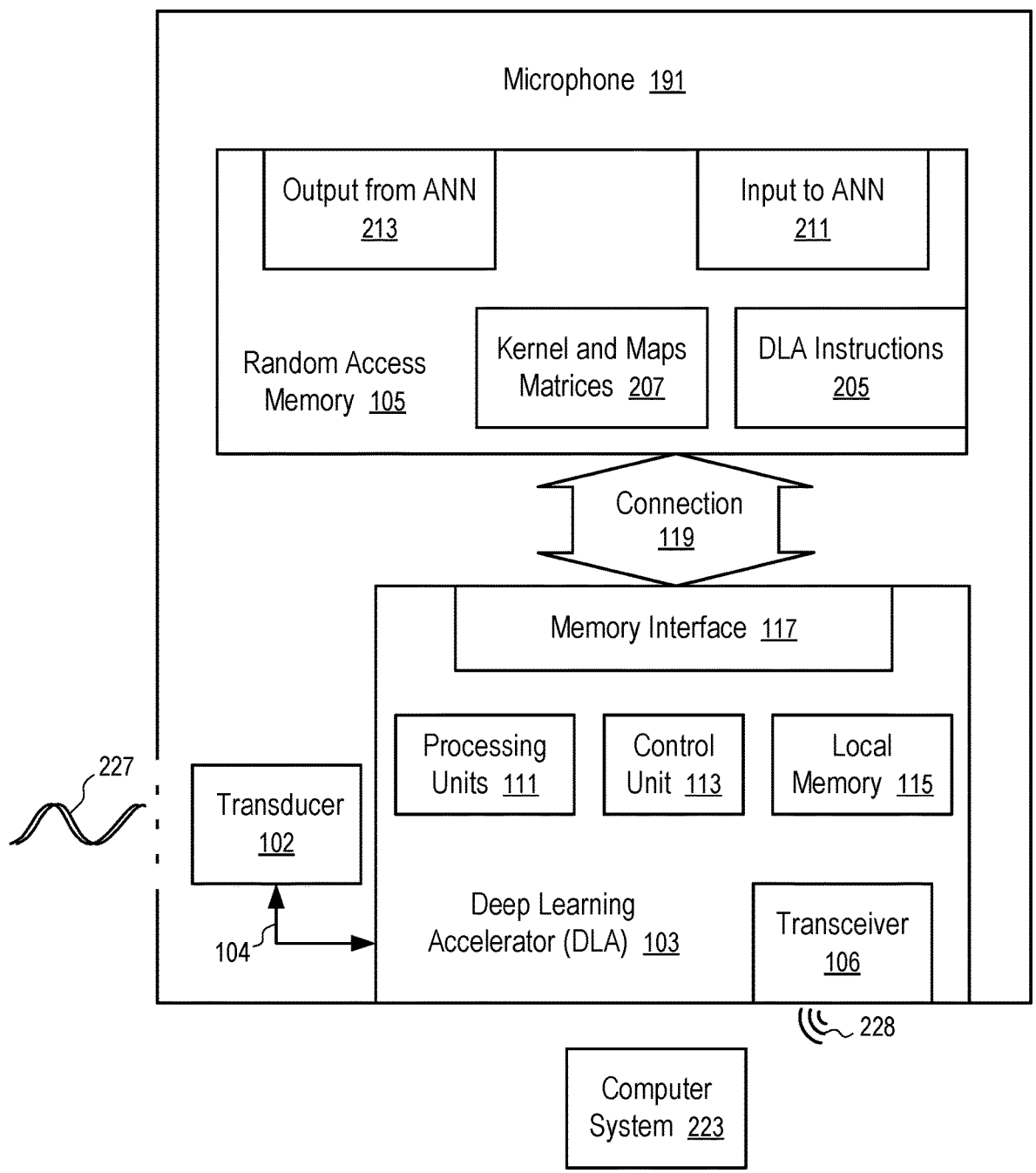
Figure 8:
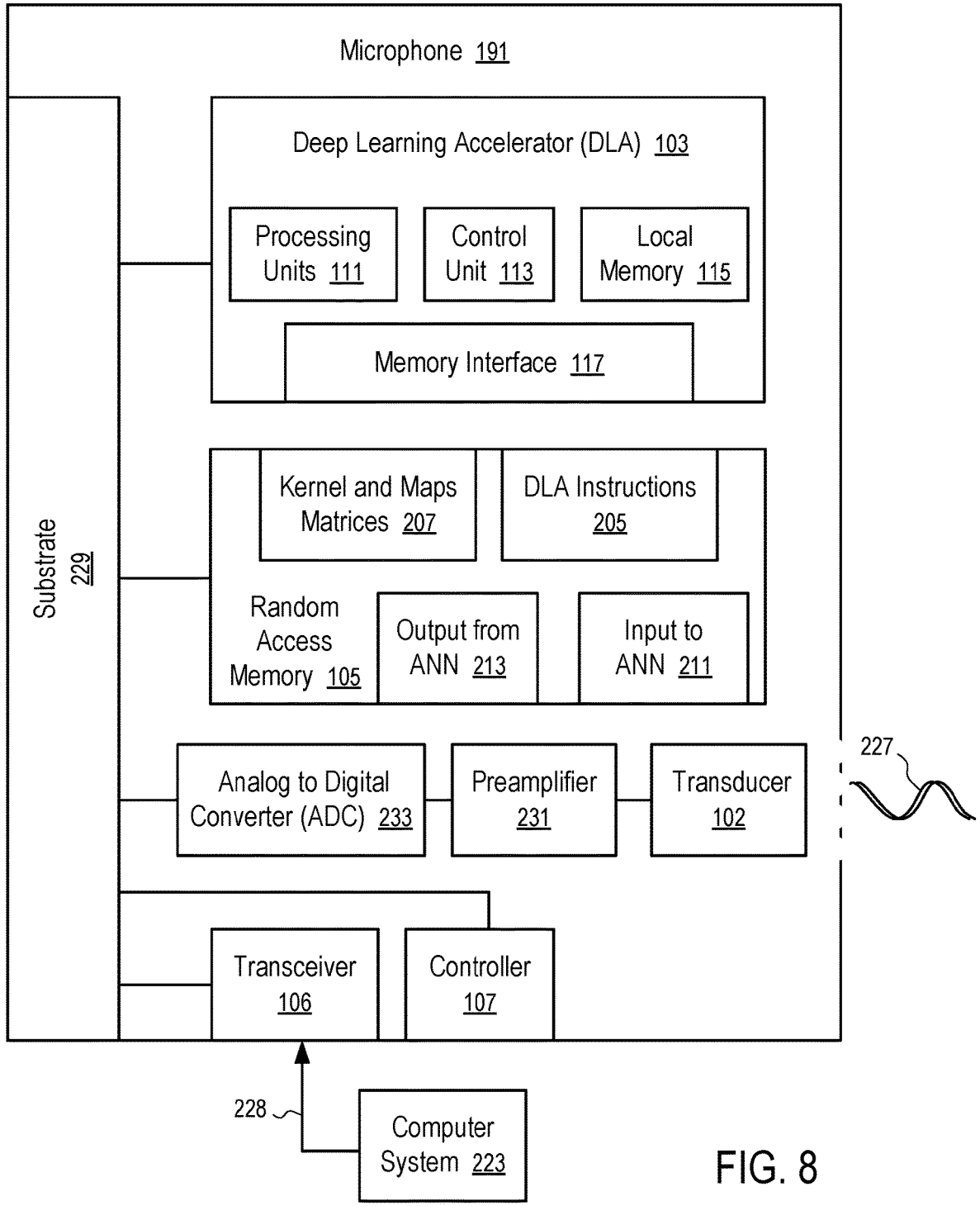

FIGS. 6-8 illustrate microphones (191) having a Deep Learning Accelerator (103) and random access memory (105) configured according to some embodiments.

A microphone (191) in FIG. 6, 7, or 8 includes a transducer (102) that converts the sound waves (227) into electrical signals. For example, the transducer (102) can include a coil of wire configured in a magnetic field to generate electrical signals when sound waves (227) move the coil. For example, the transducer (102) can include a diaphragm configured as a capacitor plate that changes the impedance of a circuit to generate electrical signals in accordance with the movement of the diaphragm caused by the sound waves (227). For example, the transducer (102) can include a piezoelectric element that generates electrical signals based on changes of pressure applied on piezoelectric the element as a result of the sound waves (227). For example, the transducer (102) can include a laser beam that measures the vibration of a surface or a diaphragm moved by the sound waves (227).

The transducer (102) can be a MicroElectrical-Mechanical System (MEMS) device integrated on an integrated circuit die having circuitry to amplify the electrical signals produced by the transducer (102) and an Analog to Digital Converter (ADC) to generate audio data according to the amplified electrical signals. For example, a pressure-sensitive diaphragm can be etched into an integrated circuit die to generate electrical signals directly in the integrated circuit die. A preamplifier can be configured on the integrated circuit die to amplify the electrical signals. An Analog to Digital Converter (ADC) can be configured on the integrated circuit die to convert the amplified signals into audio data, that can be further processed by logic circuits (e.g., implemented using CMOS (Complementary Metal Oxide Semiconductor)). Alternatively, the MEMS transducer (102) can be implemented using a piezoelectric element configured on the integrated circuit die to generate electrical signals.

In FIG. 6, an integrated circuit device (101) includes not only a Deep Learning Accelerator (103) and random access memory (105) but also a transducer (102), a controller (107), and the logic circuit of a transceiver (106). The transducer (102) can include, or be connected, to a preamplifier and/or an Analog to Digital Converter (ADC) to provide audio data.

For example, the transducer (102), the controller (107), and the transceiver (106) can be formed on an integrated circuit die that is stacked on and connected to the integrated circuit die(s) of the random access memory (105). Thus, the audio data generated by the transducer (102) can be stored by the controller (107) into the random access memory (105)

as the input (211) to the Artificial Neural Network (201) implemented using the Deep Learning Accelerator (103).

Alternatively, the transducer (102) can be formed on an integrated circuit die that is separate from the controller (107) and/or the transceiver (106).

In some implementations, the transducer (102) contains a state machine that writes audio data generated in the transducer (102) in a cyclic way in a predetermined region for the input (211) to the Artificial Neural Network (201). For example, once the state machine is instructed to operate, the transducer (102) captures a sequences of electrical signals, generates audio data representing the electrical signals, stores the audio data sequentially in the predetermined region for the input (211). When the last portion in the predetermined region for the input (211) is used for the latest audio data, the state machine goes back to storing further audio data from the beginning portion of the predetermined region, which erases/writes over the oldest portion of audio data in the predetermined region. Subsequent audio data can be stored sequentially in the predetermined region to further erase/write over the oldest audio data currently in the predetermined region.

In some implementations, the state machine of the transducer (102) can write the audio data to the random access memory (105) through a set of Through-Silicon Vias (TSVs) without going through the controller (107). Alternatively, the controller (107) receives the audio stream from the transducer (102) and writes the audio stream in a cyclic way into the input region as the input (211) to the Artificial Neural Network (201).

The transducer (102) can be configured on a top portion of the integrated circuit device (101) with an opening that allows sound waves (227) to reach the transducer (102). The connectors (e.g., pins or contacts) of the integrated circuit device (101) can be configured at the bottom of the integrated circuit device (101), or sides of the integrated circuit device (101).

The integrated circuit device (101) of FIG. 6 has a controller (107) that is configured to control the operations of the transducer (102) via a connection (104) in the integrated circuit device (101). The controller (107) can be implemented, for example, using a microcontroller or a sequencer that controls the timing of the operations of the transducer (102) and loads audio data from the transducer (102) into the random access memory (105).

Optionally, the controller (107) can be implemented using a microprocessor that runs an application (215) stored in the random access memory (105) as firmware to coordinate the operations among the transducer (102), the random access memory (105), the Deep Learning Accelerator (103), and/or a transceiver (106).

After a set of audio data is stored into the random access memory (105) as the input (211) to the Artificial Neural Network (201), the controller (107) can cause the Deep Learning Accelerator (103) to execute the instructions (205) and generate the output (213) of the Artificial Neural Network (201).

For example, the controller (107) can instruct the Deep Learning Accelerator (103) to start the execution of the instructions (205) by writing the address of the input (211) at a predefined location in the random access memory (105). When the Deep Learning Accelerator (103) is in an idle state, the Deep Learning Accelerator (103) can periodically read the address stored at the predefined location in the random access memory (105). When a new and/or valid address is retrieved from the predefined location, the Deep Learning Accelerator (103) starts the execution of the instructions (205). Optionally, after starting the execution of the instructions (205), the Deep Learning Accelerator (103) can optionally clear, erase or invalidate the address previously stored at the predefined location in the random access memory (105).

Alternatively, the controller (107) is configured to send a signal or a message to the Deep Learning Accelerator (103) to instruct the Deep Learning Accelerator (103) to execute the instructions (205). The signal or a message can be transmitted from the controller (107) to the Deep Learning Accelerator (103) using a direct connection that does not go through the memory cells of the random access memory (105).

In some implementations, the controller (107) and the Deep Learning Accelerator (103) have separate connections (109 and 119) to the random access memory (105). When the controller (107) and the Deep Learning Accelerator (103) are not accessing a same block or address of the random access memory (105), the connections (109 and 119) can be used by the controller (107) and the Deep Learning Accelerator (103) in parallel to access different portions of the random access memory (105) simultaneously.

In other implementations, the control unit (113) and the controller (107) can share at least a portion of their circuitry in the Deep Learning Accelerator (103) and use the same memory interface (117) to access the random access memory (105).

A portion of the processing units (111) can be implemented using neuromorphic memory (225). For example, the neuromorphic memory (225) can include a crossbar array of memristors configured to perform Multiply-and-Accumulate (MAC) operations via analog circuitry. For example, a multiply-accumulate units (e.g., 171 or 173) in a vector-vector unit (e.g., 161) of the Deep Learning Accelerator (103) can be implemented using a crossbar array of memristors. The memristors can be connected in an array with wordlines and bitlines configured to address the memristors as memory cells. A typical memristor is connected to one of the wordlines and one of the bitlines in the array. Electric currents going through the wordlines through a set of memristors in the crossbar array to a bitline are summed in the bitline, which corresponds to the accumulation operation. The electric currents correspond to the multiplication of the voltages applied on the wordlines and parameters associated with the resistances of the memristors, which corresponds to the multiplication operations. The current in the bitline can be compared with a threshold to determine whether a neuron represented by the bitline is activated under the current input. An array of memristors can be connected to the bitlines respectively and programmed to have thresholds corresponding to the activation level thresholds of the neurons. A current detector can be configured for each memristor connected to the output of a bitline to determine whether the level of electric current in the bitline corresponding to a level that exceeds the threshold of the memristor. The neuromorphic memory (225) can perform the Multiply-and-Accumulate (MAC) operations in a way similar to a memory device reading an array of memory cells and thus with low energy cost and high computation speed.

Through a connection (108) the controller (107) operates the transceiver (106) of the integrated circuit device (101) of FIG. 6 to communicate with a separate computer system (223) through a wireless connection (228). Alternatively, or in combination, the microphone (191) includes a transceiver for a wired connection (228).

For example, the transceiver (106) can be configured to communicate according to a communication protocol for a local area network, a peripheral bus, a Mobile Industry Processor Interface, a wireless personal area network or a wireless local area network, or a communication protocol of Internet of Things (IoTs). For example, the transceiver (106) can be formed on a Radio Frequency (RF) CMOS (Complementary Metal Oxide Semiconductor) integrated circuit chip.

For example, the microphone (191) can use the transceiver (106) to transmit the output (213) of the Artificial Neural Network (201) to the computer system (223).

For example, the microphone (191) can use the transceiver (106) to transmit an alert to the computer system (223) based on the output (213) of the Artificial Neural Network (201).

The transceiver (106) can be used by the microphone (191) to receive data and/or instructions from the computer system (223), such as the matrices (207) and the instructions (205) of the Artificial Neural Network (201). The transceiver (106) can be used by the microphone (191) to report, to the computer system (223), retrieve the output (213) of the Artificial Neural Network (201) computed by the Deep Learning Accelerator (103).

Optionally, the computer system (223) can communicate with the microphone (191) to request the microphone (191) to transmit the input (211) associated with the output (213). In response, the transceiver (106) transmits the input (211) to the computer system (223), which allows the computer system (223) to selectively analyze input (211) to the Artificial Neural Network (201).

Alternatively, the microphone (191) automatically selects the input (211) for transmission to the computer system (223) based on the output (213) of the Artificial Neural Network (201).

In some implementations, the microphone (191) is configured to report the output (213) to the computer system (223). For example, when the Deep Learning Accelerator (103) completes the computation of a set of output (213), the controller (107) generates a message reporting the availability of the output (213). The transceiver (106) transmits the message to the computer system (223). As a response, the computer system (223) can optionally accept the transmission of the output (213) immediately, request the delay of the transmission of the output (213) for a period of time, or request the postponement of the generation of the next set of output (213).

In some implementations, the control unit (113) of the Deep Learning Accelerator (103) can include the controller (107); and the logic circuit of the transceiver (106) can be implemented on the integrated circuit die of the Deep Learning Accelerator (103), as illustrated in FIG. 7.

In FIG. 7, the Deep Learning Accelerator (103) is configured on an integrated circuit die; and the random access memory (105) is configured on one or more integrated circuit dies. The control unit (113) controls not only the execution of the instructions (205) of the Artificial Neural Network (201), but also the communications of the transceiver (106) with the computer system (223) and the operations of the transducer (102).

For example, the control unit (113) periodically retrieves audio data from the sensors (102) and stores the audio data into the random access memory (105) through the high bandwidth connection (119).

In some implementations, the transducer (102) is enclosed in an integrated circuit package of an integrated circuit device (101) (e.g., as illustrated in FIG. 6).

Alternatively, a transducer (102) can be a separate component outside of an integrated circuit package that encloses the Deep Learning Accelerator (103) and the random access memory (105).

For example, the transducer (102) and an integrated circuit device (101) having the Deep Learning Accelerator (103) and the random access memory (105) can be mounted on a printed circuit board configured in the microphone (191).

The microphone (191) of FIG. 8 has a substrate (229) that provides connections among its components, such as a Deep Learning Accelerator (103), random access memory (105), a transducer (102), a preamplifier (231), an analog to digital converter (ADC) (233), a controller (107), and a transceiver (106).

In some implementations, the substrate (229) includes an integrated circuit die having wires for connecting the components. Some of the components (e.g., the integrated circuit die(s) of the random access memory (105), the Deep Learning Accelerator (103), the controller (107), the preamplifier (231), the analog to digital converter (ADC) (233), and/or the transceiver (106)) can be connected to the integrated circuit die of the substrate (229) via Through Silicon Vias (TSVs). Other components can be connected to the substrate (229) via wire bonding, die attach, or another technique.

In some implementations, the substrate (229) further includes a printed circuit board having wires for connecting the components and other components, such as a power source (e.g., battery), a display, a light-emitting diode (LED) indicator, etc.

In some implementations, the transceiver (106), the preamplifier (231), and the analog to digital converter (ADC) (233) are integrated in a same integrated circuit chip; and the output of the integrated circuit chip includes audio data routed to the controller (107) via the substrate. In other implementations, the transceiver (106) is separate from the preamplifier (231) and/or the analog to digital converter (ADC) (233); and the preamplifier (231) and/or the analog to digital converter (ADC) (233) can be configured on a same integrated circuit chip of the transceiver (106) and/or the controller (107).

In some implementations, the logic circuit of the transceiver (106) and/or the controller (107) are configured on the integrated circuit die of the Deep Learning Accelerator (103), or another integrated circuit die.

Figure 9:
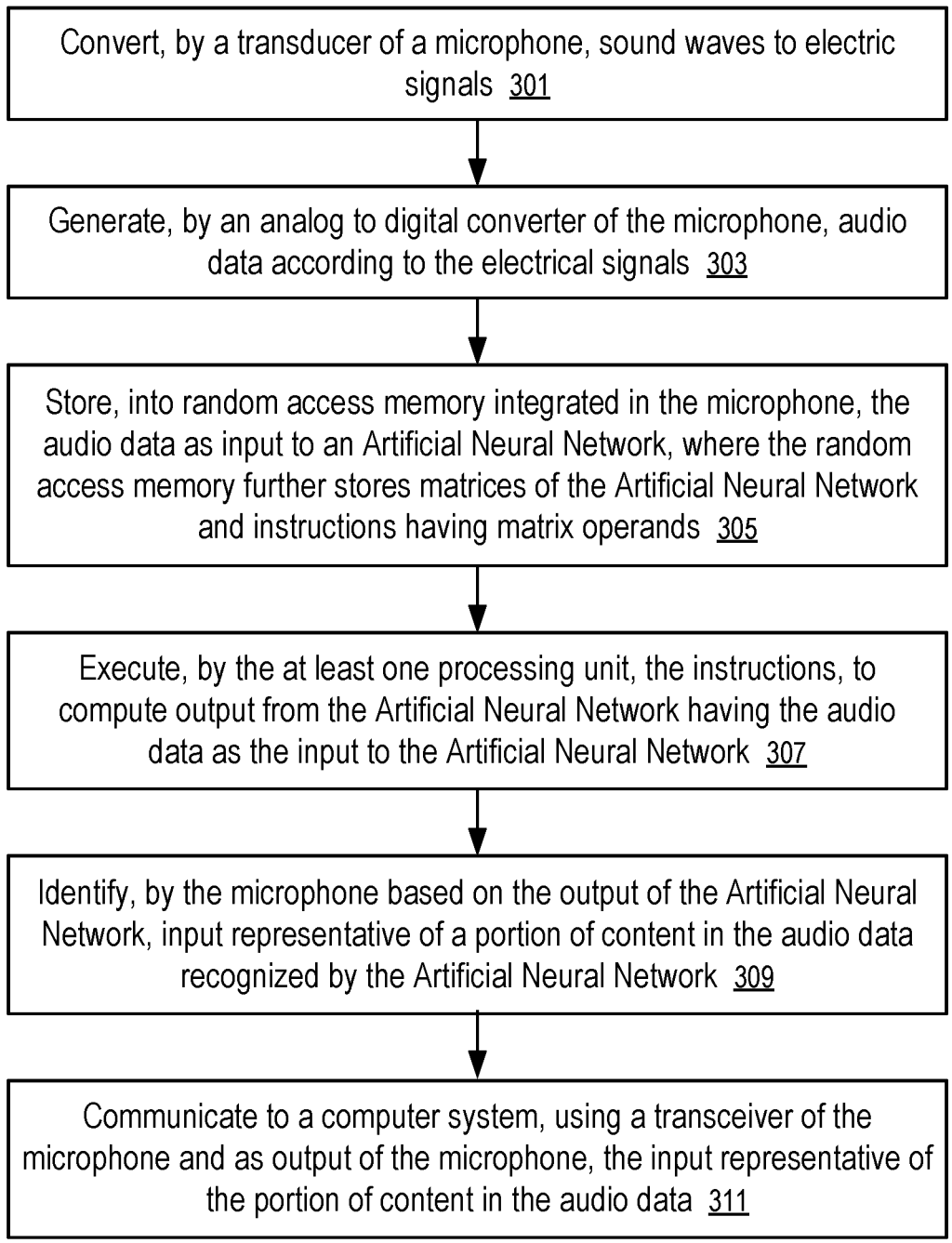
FIG. 9 shows a method implemented in a microphone according to one embodiment.

FIG. 9 shows a method implemented in a microphone according to one embodiment. For example, the method of FIG. 9 can be implemented in the microphone (191) of FIG. 6, FIG. 7, or FIG. 8.

At block 301, a transducer (102) of a microphone (191) converts sound waves (227) to electric signals.

For example, the transducer (102) can include a diaphragm etched into an integrated circuit die and configured as a plate of a capacitor to generate the electrical signals.

For example, the transducer (102) can include a piezoelectric element formed on an integrated circuit die and configured to generate the electrical signals.

For example, the transducer (102) can include a coil of wires configured in a magnetic field to generate electrical signals.

For example, the transducer (102) can include laser configured to measure movement of a diaphragm.

At block 303, an analog to digital converter (233) of the microphone (191) generates audio data according to the electrical signals.

For example, a preamplifier (231) can be configured between the transducer (102) and the analog to digital converter (233) to amplify the electrical signals for the analog to digital converter (233).

At block 305, the microphone (191) stores, into random access memory (105) integrated in the microphone (191), the audio data as input (211) to an Artificial Neural Network (201). The random access memory (105) further stores matrices (207) of the Artificial Neural Network (201) and instructions (205) having matrix operands.

At block 307, at least one processing unit (111) integrated in the microphone (191) executes the instructions having the matrix operands, to compute output (213) from the Artificial Neural Network (201) having the audio data as the input (211) to the Artificial Neural Network (201).

For example, the at least one processing unit (111) can be formed on an integrated circuit die of a Field-Programmable Gate Array (FPGA) or Application Specific Integrated circuit (ASIC) implementing a Deep Learning Accelerator (103). The Deep Learning Accelerator (103) can include the at least one processing unit (111) for matrix instruction execution, local memory (115) to buffer matrix operands and results, a control unit (113) that can load the instructions (205) from random access memory (105) for execution, and a memory interface (117) to access the random access memory (105).

For example, an integrated circuit package configured to enclose at least the integrated circuit die of FPGA or ASIC and one or more integrated circuit dies of the random access memory. In some implementations, the integrated circuit package further encloses substantially the transducer (102), the preamplifier (231), and/or the analog to digital converter (ADC) (233), with a passage or opening that allows the sound waves (227) to reach the transducer (102).

For example, the random access memory (105) and the Deep Learning Accelerator (103) are formed on separate integrated circuit dies and connected by Through-Silicon Vias (TSVs).

For example, the transducer (102) can be formed on an integrated circuit die that is stacked on one or more integrated circuit die of the random access memory (105), or the integrated circuit die of the Deep Learning Accelerator (103); and circuitry in the transducer (102) can be connected to the integrated circuit die(s) of the random access memory (105) or the Deep Learning Accelerator (103) using Through-Silicon Vias (TSVs) from the integrated circuit die of the transducer (102).

At block 309, the microphone (191) identifies, by based on the output (213) of the Artificial Neural Network (201), input representative of a portion of content in the audio data recognized by the Artificial Neural Network.

At block 311, the microphone (191) communicates to a computer system (223) (e.g., a voice-based digital assistant), using a transceiver (106) of the microphone (191) and as output of the microphone (191), the input representative of the portion of the content in the audio data.

For example, a remaining portion of the content recognizable from the audio data can be filtered out and being excluded from the input provided to the computer system.

For example, the microphone (191) can have a controller (107) to operate the transceiver (106). The controller (107) can be separate from the control unit (113) or be integrated within the control unit of the Deep Learning Accelerator (103).

For example, the output (213) of the Artificial Neural Network (201) can include an identification of a predefined sound pattern that is recognized by the Artificial Neural Network (201). For example, such a predefined sound pattern can include one or more words spoken by a predetermined person and recognized from the audio data, or a sound pattern associated with a fall, a breathing problem, a disease in a respiratory system, etc.

Optionally, the method can further include training, in the microphone (191), the Artificial Neural Network (201) to recognize voice of the predetermined person using a machine learning technique. Thus, the voice model of the person is secured in the microphone (191).

Alternatively, a voice model of the predetermined person can be downloaded from or via the computer system (223) to the microphone (191).

The Artificial Neural Network (201) can be configured to determine whether the words are spoken by the predetermined person using a voice model stored in the microphone (191); and the controller (107) can be configured to communicate the words to the computer system in response to a classification that the words are spoken by the predetermined person.

Optionally, the Artificial Neural Network (201) can be further configured to classify, based on the audio data, a mode of conversation of the words spoken by the predetermined person; and the microphone (191) is configured to communicate its output to the computer system (223) in response to the mode being in a predefined category.

For example, the mode can identify an emotional state of the person in speaking the words, a context of speaking the words, or a degree of relevancy of the words to a voice-based digital assistant, or any combination thereof.

Optionally, the controller (107) of the microphone (191) is configured to determine, based on the output (213) of the Artificial Neural Network (201), whether to retain the audio data for transmission to the computer system (223); and the computer system (223) may request for the audio data corresponding to the input (211) to the Artificial Neural Network (201) in some instances.

For example, the computer system (223) can include a voice-based digital assistant; and the output (213) of the Artificial Neural Network (201) can be transmitted from the microphone (191) as input to the voice-based digital assistant without the audio data being transmitted to the voice-based digital assistant.

For example, the voice-based digital assistant can be implemented in a speaker, a television, an appliance, a mobile computer, a mobile phone, a personal media player, a personal computer, a hub of Internet of Things (IoT), an IoT device, a server computer, or a cluster of server computers, or any combination thereof.

The present disclosure includes methods and apparatuses which perform the methods described above, including data processing systems which perform these methods, and computer readable media containing instructions which when executed on data processing systems cause the systems to perform these methods.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, Read Only Memory (ROM), Random Access Memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:
1. A device, comprising:
a microphone operable to be connected a separate computer system as a host to provide audio data captured by the microphone to the host, the microphone having:
a transducer operable to convert sound input to the audio data;

a transceiver configured to provide a connection to the separate computer system;

random access memory separate from the computer system and accessible to the computer system over the connection through the transceiver; and a logic circuit coupled with the random access memory and the microphone to process audio data generated by the microphone, wherein when the random access memory stores first data representative of weights of an artificial neural network and second data representative of instructions having matrix operands and executable to implement matrix computations of the artificial neural network using the first data representative of the weights of the artificial neural network, the logic circuit is configured to write the audio data into the random access memory as a first input to the artificial neural network and execute the instructions represented by the second data stored in the random access memory to generate an output of the artificial neural network based at least in part on the first data and the audio data stored in the random access memory, wherein the logic circuit is configured to:

identify, based on the output of the artificial neural network, a second input representative of a portion of content in the audio data recognized by the artificial neural network, and filter a remaining portion of the content from the second input;

classify, by utilizing the artificial neural network, a mode of the audio data including a context of the audio data;

generate a text output from the audio data when the mode is in at least one predefined category; and suppress the text output from the audio data when the mode is determined to be in at least one other category; and wherein the transceiver is configured to communicate the second input to the computer system.

2. The device of claim 1, wherein the microphone comprises:

the transducer operable to convert sound waves to electrical signals; and a converter coupled with the transducer to generate the audio data according to the electrical signals, wherein the logic circuit is coupled with the converter.

3. The device of claim 2, wherein the converter includes an analog to digital converter.

4. The device of claim 3, wherein the logic circuit comprises at least one processing unit configured to execute the instructions having matrix operands and executable to implement matrix computations; and the device further comprises:

an integrated circuit package configured to enclose at least the logic circuit and the random access memory.

5. The device of claim 4, wherein the integrated circuit package is further configured to enclose the transducer.

6. The device of claim 5, wherein the transducer includes a diaphragm etched into an integrated circuit die, or a piezoelectric element formed on an integrated circuit die, or any combination thereof.

7. The device of claim 5 wherein the artificial neural network is configured to output identifications of words as spoken in the audio data.

8. The device of claim 7, wherein the logic circuit is further configured to train the artificial neural network to recognize voice of a person using a machine learning technique.

9. The device of claim 7, wherein the logic circuit is further configured to download, from the computer system, data representative of a voice model of a person and use the voice model to identify the words as spoken in the audio data.

10. The device of claim 7, wherein the artificial neural network is further configured to output a classification of the mode of as spoken in the audio data; and the device configured to communicate an input, based on the audio data, to the computer system in response to the classification being in a predefined category.

11. The device of claim 7, wherein the logic circuit is configured to determine, based on the output of the artificial neural network, whether to retain the audio data for transmission to the computer system.

12. A method, comprising:

generating, by a microphone of a device, audio data;

processing, in a logic circuit of the microphone of the device having random access memory, the audio data using:

first data, stored in the random access memory, representative of weights of an artificial neural network; and second data, stored in the random access memory, representative of instructions having matrix operands and executable to implement matrix computations of the artificial neural network using the first data representative of the weights of the artificial neural network, the processing including:

writing, by the logic circuit, the audio data into the random access memory as a first input to the artificial neural network; and executing, the instructions represented by the second data stored in the random access memory to generate an output of the artificial neural network based at least in part on the first data and the audio data stored in the random access memory;

identifying, based on the output of the artificial neural network, a second input representative of a portion of content in the audio data;

filtering a remaining portion of the content from the second input;

classifying, by utilizing the artificial neural network, a mode of the audio data including a context of the audio data;

generating a text output from the audio data when the mode is in at least one predefined category; and suppressing the text output from the audio data when the mode is determined to be in at least one other category; and communicating, from a transceiver of the device, the second input to a voice-based digital assistant.

13. The method of claim 12, wherein the output includes an identification of a predefined sound pattern in the audio data.

14. The method of claim 12 wherein the output includes identifications of words as spoken by a predefined person in the audio data.

15. The method of claim 14, further comprising:

training, in the device, the artificial neural network to recognize voice of the person using a machine learning technique.

16. The method of claim 14, further comprising:

downloading, from a computer system, data representative of a voice model of the person; and identifying the words as spoken in the audio data by the person using the voice model.

17. The method of claim 14, wherein the communicating the output to the voice-based digital assistant is in response to a determination that a classification of the mode of the audio data is in the at least one predefined category.

18. The method of claim 14, further comprising:
determining, based on the output of the artificial neural network, whether to retain the audio data for transmission to the voice-based digital assistant.

19. An apparatus, comprising:
a voice-based digital assistant; and
a microphone, comprising:
  random access memory;
  a logic circuit coupled with the random access memory to process audio data generated by the microphone, wherein when the random access memory stores first data representative of weights of an artificial neural network and second data representative of instructions having matrix operands and executable to implement matrix computations of the artificial neural network using the first data representative of the weights of the artificial neural network, the logic circuit is configured to write the audio data into the random access memory as a first input to the artificial neural network and execute the instructions represented by the second data stored in the random access memory to generate an output of the artificial neural network based at least in part on the first data and the audio data stored in the random access memory, wherein the logic circuit is configured to:
    identify, based on the output of the artificial neural network, a second input representative of a portion of content in the audio data recognized by the artificial neural network, and filter a remaining portion of the content from the second input;
    classify, by utilizing the artificial neural network, a mode of the audio data including a context of the audio data;
    generate a text output from the audio data when the mode is in at least one predefined category; and
    suppress the text output from the audio data when the mode is determined to be in at least one other category; and
  a transceiver configured to communicate the second input to a voice-based digital assistant.

20. The apparatus of claim 19, wherein the voice-based digital assistant includes a speaker, a television, an appliance, a mobile computer, a mobile phone, a personal media player, a personal computer, a hub of Internet of Things (IoT), an IoT device, a server computer, or a cluster of server computers, or any combination thereof.

* * * * *